United States Patent
Silk et al.

(10) Patent No.: US 11,741,300 B2
(45) Date of Patent: Aug. 29, 2023

(54) EMBEDDED SPREADSHEET DATA IMPLEMENTATION AND SYNCHRONIZATION

(71) Applicant: Dropbox, Inc., San Francisco, CA (US)

(72) Inventors: Gabriel Silk, San Francisco, CA (US); Andrew Udell, San Francisco, CA (US); Arjun Mahadevan, San Francisco, CA (US)

(73) Assignee: DROPBOX, INC., San Francisco, CA (US)

( * ) Notice: Subject to any disclaimer, the term of this patent is extended or adjusted under 35 U.S.C. 154(b) by 263 days.

(21) Appl. No.: 15/802,458

(22) Filed: Nov. 3, 2017

(65) Prior Publication Data

US 2019/0138588 A1    May 9, 2019

(51) Int. Cl.
| | |
|---|---|
| G06F 40/18 | (2020.01) |
| G06F 16/23 | (2019.01) |
| G06F 16/27 | (2019.01) |
| G06F 16/93 | (2019.01) |

(52) U.S. Cl.
CPC .............. G06F 40/18 (2020.01); G06F 16/23 (2019.01); G06F 16/27 (2019.01); G06F 16/93 (2019.01)

(58) Field of Classification Search
CPC ........ G06F 17/246; G06F 40/18; G06F 16/23; G06F 16/27; G06F 16/93
See application file for complete search history.

(56) References Cited

U.S. PATENT DOCUMENTS

| | | | |
|---|---|---|---|
| 6,694,309 B2 * | 2/2004 | Cho ...................... | G06F 17/246 |
| | | | 707/600 |
| 7,596,766 B1 | 9/2009 | Sharma et al. | |
| 7,843,454 B1 | 11/2010 | Biswas | |

(Continued)

FOREIGN PATENT DOCUMENTS

JP        H0696077 A        4/1994

OTHER PUBLICATIONS

Attwood J., "Embed Drive Folders Into your Google Sites," Uploaded Mar. 19, 2013, retrieved from https://www.youtube.com/watch?v=SDqP4FkoT81, pp. 1-13.

(Continued)

*Primary Examiner* — Pierre M Vital
*Assistant Examiner* — Andrew N Ho
(74) *Attorney, Agent, or Firm* — Fenwick & West LLP

(57) ABSTRACT

A collaborative content management system allows for the mutual-synchronization of content within a spreadsheet and within a document in which a set of spreadsheet cells are embedded. When a user modifies the embedded set of cells, the spreadsheet is updated to reflect the modification. A set of tasks, for instance each associated with descriptive text and one or more interactive elements, can be incorporated into a set of spreadsheet cells such that a user can interact with the tasks. A data value from a spreadsheet cell can be embedded into a document such that when the spreadsheet is updated and the data value changes, the corresponding embedded data value within the document can be changed. Spreadsheets can also include comments that can be navigated using a movable interface element that changes position within the spreadsheet based on a location of a set of cells corresponding to a comment.

20 Claims, 16 Drawing Sheets

(56) References Cited

U.S. PATENT DOCUMENTS

| | | | |
|---|---|---|---|
| 7,873,916 B1 | 1/2011 | Chaudhri | |
| 8,205,172 B2 | 6/2012 | Wong et al. | |
| 8,370,464 B1 | 2/2013 | Chitilian et al. | |
| 8,484,561 B1* | 7/2013 | Lemonik | G06Q 10/101 |
| | | | 715/255 |
| 8,549,434 B2 | 10/2013 | Ouzts et al. | |
| 9,310,981 B2 | 4/2016 | Lynch et al. | |
| 9,395,893 B1 | 7/2016 | Beausoleil et al. | |
| 10,437,923 B2 | 10/2019 | Silk et al. | |
| 2002/0091662 A1* | 7/2002 | Bogia | G06F 16/93 |
| 2003/0105819 A1* | 6/2003 | Kim | G06F 16/954 |
| | | | 709/205 |
| 2004/0172425 A1* | 9/2004 | Edelstein | G06F 40/194 |
| | | | 707/999.203 |
| 2004/0205504 A1 | 10/2004 | Phillips | |
| 2005/0033813 A1 | 2/2005 | Bhogal et al. | |
| 2005/0149935 A1 | 7/2005 | Benedetti | |
| 2005/0210392 A1* | 9/2005 | Koide | G06F 40/169 |
| | | | 715/751 |
| 2006/0036568 A1 | 2/2006 | Moore et al. | |
| 2006/0224946 A1* | 10/2006 | Barrett | G06F 17/246 |
| | | | 715/210 |
| 2007/0061745 A1 | 3/2007 | Anthony et al. | |
| 2007/0156670 A1 | 7/2007 | Lim | |
| 2007/0233811 A1* | 10/2007 | Rochelle | G06F 17/246 |
| | | | 709/219 |
| 2008/0126967 A1 | 5/2008 | Lusen et al. | |
| 2008/0129757 A1 | 6/2008 | Tanaka et al. | |
| 2008/0172625 A1 | 7/2008 | Montgomery et al. | |
| 2008/0209363 A1 | 8/2008 | Kurod | |
| 2008/0221946 A1 | 9/2008 | Balon et al. | |
| 2008/0244582 A1 | 10/2008 | Brown et al. | |
| 2009/0249446 A1 | 10/2009 | Jenkins et al. | |
| 2009/0307622 A1 | 12/2009 | Jalon et al. | |
| 2010/0050114 A1 | 2/2010 | Braun et al. | |
| 2010/0174678 A1* | 7/2010 | Massand | G06F 40/18 |
| | | | 707/610 |
| 2010/0251085 A1 | 9/2010 | Zearing et al. | |
| 2011/0040610 A1 | 2/2011 | Araiza-Boys | |
| 2011/0209048 A1* | 8/2011 | Scott | G06F 16/958 |
| | | | 715/236 |
| 2011/0252299 A1 | 10/2011 | Lloyd et al. | |
| 2011/0252300 A1* | 10/2011 | Lloyd | G06F 40/166 |
| | | | 715/217 |
| 2011/0258540 A1 | 10/2011 | Ueda et al. | |
| 2011/0271220 A1 | 11/2011 | Remsberg et al. | |
| 2011/0283242 A1 | 11/2011 | Chew et al. | |
| 2011/0296351 A1 | 12/2011 | Ewing et al. | |
| 2011/0307772 A1* | 12/2011 | Lloyd | G06F 17/246 |
| | | | 715/212 |
| 2012/0030626 A1 | 2/2012 | Hopkins et al. | |
| 2012/0110515 A1 | 5/2012 | Abramoff et al. | |
| 2013/0002796 A1 | 1/2013 | Hiller et al. | |
| 2013/0013560 A1 | 1/2013 | Goldberg et al. | |
| 2013/0024418 A1 | 1/2013 | Sitrick et al. | |
| 2013/0042201 A1 | 2/2013 | Sandman et al. | |
| 2013/0097481 A1 | 4/2013 | Kotler et al. | |
| 2013/0097490 A1* | 4/2013 | Kotler | G06F 17/21 |
| | | | 715/255 |
| 2013/0111368 A1 | 5/2013 | Laughlin | |
| 2013/0124955 A1 | 5/2013 | Goel et al. | |
| 2013/0151940 A1 | 6/2013 | Bailor et al. | |
| 2013/0218845 A1* | 8/2013 | Kleppner | G06F 17/24 |
| | | | 707/687 |
| 2013/0219256 A1 | 8/2013 | Lloyd et al. | |
| 2013/0232149 A1* | 9/2013 | Smith | G06F 16/972 |
| | | | 707/740 |
| 2013/0262373 A1* | 10/2013 | Rampson | G06F 40/197 |
| | | | 707/608 |
| 2013/0262975 A1 | 10/2013 | Rochelle et al. | |
| 2013/0263289 A1 | 10/2013 | Vijayan et al. | |
| 2013/0291126 A1 | 10/2013 | Thomson | |
| 2013/0339830 A1 | 12/2013 | Yuan et al. | |
| 2013/0346849 A1 | 12/2013 | Krueger | |
| 2014/0047349 A1 | 2/2014 | Kulkarni et al. | |
| 2014/0123002 A1 | 5/2014 | Wessling et al. | |
| 2014/0172799 A1 | 6/2014 | Dorman | |
| 2014/0189483 A1 | 7/2014 | Awan et al. | |
| 2014/0207867 A1* | 7/2014 | Kotler | H04L 67/38 |
| | | | 709/204 |
| 2014/0244653 A1 | 8/2014 | Plotkin et al. | |
| 2014/0258972 A1 | 9/2014 | Savage et al. | |
| 2014/0310601 A1 | 10/2014 | Matejka et al. | |
| 2014/0337278 A1 | 11/2014 | Barton et al. | |
| 2014/0359533 A1 | 12/2014 | Hahm et al. | |
| 2014/0372852 A1* | 12/2014 | Rothschiller | G06F 40/106 |
| | | | 715/212 |
| 2015/0082198 A1 | 3/2015 | Destagnol et al. | |
| 2015/0095839 A1 | 4/2015 | Hombert | |
| 2015/0127603 A1* | 5/2015 | Cohen | H04L 51/046 |
| | | | 707/608 |
| 2015/0134600 A1 | 5/2015 | Eisner et al. | |
| 2015/0135300 A1 | 5/2015 | Ford | |
| 2015/0195330 A1 | 7/2015 | Lee | |
| 2015/0199270 A1* | 7/2015 | Day-Richter | G06F 9/00 |
| | | | 707/816 |
| 2015/0199316 A1 | 7/2015 | Cairns et al. | |
| 2015/0199325 A1 | 7/2015 | Friske et al. | |
| 2015/0199328 A1 | 7/2015 | Danziger et al. | |
| 2015/0281148 A1* | 10/2015 | Masterson | H04L 51/08 |
| | | | 715/752 |
| 2015/0310188 A1 | 10/2015 | Ford et al. | |
| 2016/0261577 A1 | 9/2016 | Chang et al. | |
| 2017/0337174 A1* | 11/2017 | Nault | G06F 40/166 |

OTHER PUBLICATIONS

"Embedded Drive Folders," Aug. 21, 2013, retrieved from https://web.archive.org/web/20130821033849/http://sandbox.atwoodphoto.com/embedded-drive-folders on Sep. 6, 2018, pp. 1-5.

Office Action from U.S. Appl. No. 15/802,457, dated Jan. 26, 2018, 15 pages.

Office Action from U.S. Appl. No. 15/802,457, dated Jul. 5, 2018, 16 pages.

Wylie J., "Why the Folder Gadget Beats Attachments in Google Sites," Feb. 16, 2014, retrieved from https://jonathanwylie.com/2014/02/16/why-the-folder-gadget-beats-attachments-in-google-sites/ on Sep. 6, 2018, pp. 1-12.

Gookin, D., "Microsoft Word 2016 for Professionals for Dummies," John Wiley & Sons, Incorporated, First Edition, Jul. 28, 2016, 75 pages.

International Search Report and Written Opinion for PCT Application PCT/IB2018/048598 dated Dec. 19, 2018, 19 pages.

McFedries P., "Teach Yourself Visually Excel 2016," Chapter 14, retrieved from safaribooksonline.com, Oct. 2015, 52 pages.

Wikipedia, "Collaborative software," 2017, retrieved from the internet URL: https://en.wikipedia.org/w/index.php?title=Collaborative_software&oldid=807413658 on Oct. 12, 2018, 8 pages.

Wikipedia, "Content management system," 2017, retrieved from the internet URL: https://en.wikipedia.org/w/index.php?title=Content_management_system&oldid=807686694 on Oct. 12, 2018, 3 pages.

Wikipedia, "Microsoft Office 2016," 2017, retrieved from the internet URL:https://en.wikipedia.org/w/index.php?title=MicrosoftOffice2016&oldid+806196996 on Oct. 12, 2018, 7 pages.

Youtube, "Teach Excel, Excel Tips 15—Add Comments, Remove Comments, Find Comments, and Edit Comments in Excel 2007," Nov. 1, 2009, pp. 1-13, [Online] <URL: https://www.youtube.com/watch?v=WacPt3VxxEg>.

Final Office Action from U.S. Appl. No. 16/010,836, dated Mar. 24, 2020, 30 pages.

Google, "A thumbnail is worth about a hundred words," Jan. 26, 2010, 2 pages.

Advisory Action for U.S. Appl. No. 14/085,760 dated Aug. 27, 2014, 3 pages.

Bradley T., "Collaborate in Real-Time with Google Docs," Jul. 1, 2010 retrieved from https://www.pcworld.com/article/200269/collaborate_in_real_time_with_google_docs.html, on Sep. 27, 2019, 5 Pages.

(56) References Cited

OTHER PUBLICATIONS

Final Office Action for U.S. Appl. No. 14/085,760 dated Jun. 13, 2014, 25 pages.
Google Apps for Word Press, "Google Drive Embedder," Nov. 10, 2014, Youtube, pp. 1-8, Retrieved: https://www.youtube.com/watch?v=wcpjcFJIOko.
Needleman R., "Don't call it a wiki: Google Sites finally launches," Feb. 27, 2008, retrieved from https://www.cnet.com/news/dont-call-it-a-wiki-google-sites-finally-launches/, on Sep. 27, 2019, 4 Pages.
Non-Final Office Action from U.S. Appl. No. 16/010,836, dated Oct. 2, 2019, 29 pages.
Notice of Allowance for U.S. Appl. No. 14/085,760 dated Sep. 22, 2014, 12 pages.
Office Action for U.S. Appl. No. 14/085,760 dated Jan. 30, 2014, 16 pages.
Office Action for U.S. Appl. No. 14/820,510 dated Aug. 25, 2016, 36 pages.
Office Action for U.S. Appl. No. 14/820,510 dated Feb. 26, 2016, 34 pages.
Non-Final Office Action for U.S. Appl. No. 16/352,428 dated Oct. 7, 2020, 11 pages.
Non-Final Office Action from U.S. Appl. No. 14/980,939, dated Jul. 27, 2020, 16 pages.
Advisory Action from U.S. Appl. No. 14/980,939, dated Oct. 29, 2019, 3 pages.
Final Office Action from U.S. Appl. No. 14/980,939, dated Sep. 12, 2019, 16 pages.
Non-Final Office Action from U.S. Appl. No. 14/980,939, dated Feb. 20, 2020, 15 pages.
Final Office Action from U.S. Appl. No. 14/980,939, dated Feb. 3, 2021, 23 pages.
Final Office Action from U.S. Appl. No. 16/352,428, dated Jan. 28, 2021, 13 pages.
Non-Final Office Action from U.S. Appl. No. 16/352,428, dated Apr. 1, 2021, 14 pages.
Notification of Reason for Refusal for Japanese Application No. 2020511313 dated Apr. 9, 2021, 5 pages.
Summons to Attend Oral Proceedings Pursuant to Rule 115(1) EPC for European Application No. 18778618.1 dated Mar. 23, 2021, 11 pages.
Final Office Action from U.S. Appl. No. 16/352,428, dated Aug. 23, 2021, 17 pages.
Gookin D., "Microsoft Word 2016 For Professionals Dummies" 2016, 75 pages.
Non-Final Office Action from U.S. Appl. No. 16/352,428, dated Dec. 20, 2021, 18 pages.
Final Office Action from U.S. Appl. No. 16/352,428, dated May 3, 2022, 20 pages.
Anonymous, "Word Real-Time Co-Authoring—A Closer Look," retrieved from https://www.microsoft.com/en-us/microsoft-365/blog/2015/10/30/word-real-time-co-authoring-a-closer-look/, XP055702497, Oct. 30, 2015, 5 pages.
Communication pursuant to Article 94(3) EPC for European Application No. 18778618.1 dated Oct. 22, 2020, 9 pages.
Office Action for Japanese Application No. 2020-511313 dated Nov. 13, 2020, 7 pages.
Udemy Media, This is Convenient! How to Convert from Word to Excel and Excel to Word [online], Aug. 3, 2016, retrieved from https://udemy.benesse.co.jp/office-enhance/microsoft-office/change-word-into-excel on Nov. 5, 2020, 23 pages.

* cited by examiner

Draft Speech

Here is the draft of the speech. @Bill_Seward, @John Hay, please comment.

"Four score and seven years ago our fathers brought forth, upon this continent, a new nation, conceived in liberty, and dedicated to the proposition that "all men are created equal."

Now we are engaged in a great civil war, testing whether that nation, or any nation so conceived, and so dedicated, can long endure. We are met on a great battle field of that war. We come to dedicate a portion of it, as a final resting place for those who died here, that the nation might live. This we may, in all propriety do.

But, in a larger sense, we can not dedicate -- we can not consecrate -- we can not hallow, this ground -- The brave men, living and dead, who struggled here, have hallowed it, far above our poor power to add or detract. The world will little note, nor long remember what we say here; while it can never forget what they did here.

Share

New Comment...

Comments (6)

Edward Everett  12/15/10 at 11:05 pm
You say in two minutes what would take me two hours. Well done.

Bill Seward  12/15/10 at 11:10 pm
Certainly the bloodiest...
              2 more comments John Hay  12/15/10 at 11:1pm
What happened to "It is altogether fitting and proper that we should do this." ???

Reply

George Bancroft  12/15/10 at 11:05 pm
I would like to use this in fundraising for soliders.
@Bill_Seward your thoughts?

Reply

FIG. 5A

Draft Speech

Here is the draft of the speech. @Bill_Seward, @John Hay, please comment.

"Four score and seven years ago our fathers brought forth, upon this continent, a new nation, conceived in liberty, and dedicated to the proposition that "all men are created equal."

Now we are engaged in a great civil war, testing whether that nation, or any nation so conceived, and so dedicated, can long endure. We are met on a great battle field of that war. We come to dedicate a portion of it, as a final resting place for those who died here, that the nation might live. This we may, in all propriety do.

But, in a larger sense, we can not dedicate – we can not consecrate – we can not hallow, this ground – The brave men, living and dead, who struggled here, have hallowed it, far above our poor power to add or detract. The world will little note, nor long remember what we say here; while it can never forget what they did here.

---

Share

Comments (7)

New Comment...

John Nicolay  12/16/10 at 8:25 am
I like this version better than the first draft
@file Reply Edward Everett  12/15/10 at 11:05 pm
You say in two minutes what would take me two hours. Well done.

Bill Seward  12/15/10 at 11:10 pm
Certainly the bloodiest...
_____ 2 more comments _____

John Hay  12/15/10 at 11:1pm
What happened to "It is altogether fitting and proper that we should do this." ???

Reply

George Bancroft  12/15/10 at 11:05 pm
I would like to use this in fundraising for soliders.
@Bill_Seward your thoughts?

Reply

FIG. 5B

|   | A | B | C | D | E |
|---|---|---|---|---|---|
| 1 |   | Jan | Feb | Mar | Apr |
| 2 | Cats Adopted | 19 | 18 | 22 | 5 |
| 3 | Dogs Adopted | 23 | 15 | 20 | 21 |
| 4 | Birds Adopted | 5 | 8 | 7 | 9 |
| 5 | Total | =SUM(B2:B4) | 41 | 49 | 35 |

*FIG. 6*

|   | A | B | C | D | E |
|---|---|---|---|---|---|
| 1 |   | Jan | Feb | Mar | Apr 3 |
| 2 | Day 1 | 20 | 18 | 10 | 5 |
| 3 | Day 2 | 23 | 11 2 | 9 | 8 |
| 4 | Day 3 | 15 | 19 | 7 | 6 |
| 5 | Total | 1000 | 48 | 26 | 17 |

Sean
The sum appears to be incorrect! Check your math. @Geena

Reply

Fig. 13A

|   | A | B | C | D | E |
|---|---|---|---|---|---|
| 1 |   | Jan | Feb | Mar | Apr [3] |
| 2 | Day 1 | 20 | 18 | 10 | 5 |
| 3 | Day 2 | 23 | [2] 11 | | 8 |
| 4 | Day 3 | 15 | 19 | | 6 |
| 5 | Total | [1] 1000 | 48 | | 19 |

Allison
Please double check this data @Sean — 1360

Sean
Done. It is correct — 1365

Reply

Fig. 13B

| | A | B | C | D | E |
|---|---|---|---|---|---|
| 1 | | Jan | Feb | Mar | Apr 3 |
| 2 | Day 1 | 20 | 18 | 10 | 5 |
| 3 | Day 2 | 23 | 11 | 9 | 8 |
| 4 | Day 3 | 15 | 19 2 | 7 | 6 |
| 5 | Total | 1 1000 | 48 | 26 | 19 |

Geena: Does this column look good?
Yes No
1375
1370
Reply

FIG. 13C

EMBEDDED SPREADSHEET DATA IMPLEMENTATION AND SYNCHRONIZATION

TECHNICAL FIELD

The disclosed embodiments generally relate to features of spreadsheets, and specifically to the implementation and management of spreadsheets in a collaborative online environment.

BACKGROUND

The online, collaborative sharing of documents is typically provided by a network-based file-sharing computer system that allows multiple users to access and edit the files. Generally, documents are created and edited by a specific type of native application, such as a word processor or spreadsheet application. However, online or networked implementations of spreadsheets generally limit collaborative functionality, reducing the usefulness of the spreadsheet to a group of users.

SUMMARY

In some embodiments, a collaborative content management system accesses a collaborative content item. The collaborative content management system receives a selected portion of a spreadsheet and embeds it into the accessed collaborative content item. The collaborative content item is displayed within an interface of a device display such that the selected portion of a spreadsheet is displayed. The collaborative content management system receives an edit to data included within the selected portion of the spreadsheet via the collaborative content item. The collaborative content management system updates the spreadsheet based on the received edit on the collaborative content item.

The collaborative content management system may receive a request to add a set of tasks to a set of one or more cells of the spreadsheet. The collaborative content management modifies the set of cells to include the set of tasks. The collaborative content management system provides the modified set of cells to a device configured to display the modified set of cells. A user can interact with a task of the set of tasks, for instance by marking it completed, or by tagging another user in the task. The collaborative content management system modifies a set of cells corresponding to the task based on the interaction.

In some embodiments, the collaborative content management system receives a request to embed a first data value included within a first cell of a spreadsheet into a document. The collaborative content management system modifies the document to include text corresponding to the first data value, for instance without incorporating structure of the spreadsheet itself. The collaborative content management system displays the document within an interface of a device display such that the first data value is displayed within the document. The collaborative content management system can receive an edit to one or more cells included within the spreadsheet that modify the first data value of the first cell to a second data value. The collaborative content management system then automatically updates the document (for instance, in real-time or after the edits to the spreadsheet are synced with the collaborative content management system) by replacing the first data value included within the document to the second data value.

A device receives a spreadsheet from a collaborative content management system. The spreadsheet includes sets of cells each associated with a comment. The device displays the spreadsheet such that one or more of the sets of cells are displayed. The device receives a request to view a comment associated with a displayed first set of cells. The device displays an interface element including the comment in a first location within the spreadsheet associated with the first subset of cells. When the device receives a request to view a second comment associated with a second subset of cells, the device moves the displayed interface element to a second location within the spreadsheet associated with the second subset of cells.

The features and advantages described in this summary and the following detailed description are not all-inclusive. Many additional features and advantages will be apparent to one of ordinary skill in the art in view of the drawings, specification, and claims hereof.

BRIEF DESCRIPTION OF THE DRAWINGS

FIG. 5A shows an example user interface of a collaborative content item page including various comments, according to example embodiments.

FIG. 5B shows an example user interface with a file-level comment associated with the title of the collaborative content item, according to example embodiments.

FIG. 6 shows an example portion of a spreadsheet, according to example embodiments.

FIGS. 13A through 13C illustrate the navigation of comments within a spreadsheet, according to example embodiments.

The figures depict various example embodiments of the present technology for purposes of illustration only. One skilled in the art will readily recognize from the following description that other alternative example embodiments of the structures and methods illustrated herein may be employed without departing from the principles of the technology described herein.

DETAILED DESCRIPTION

System Overview

Figure 1:
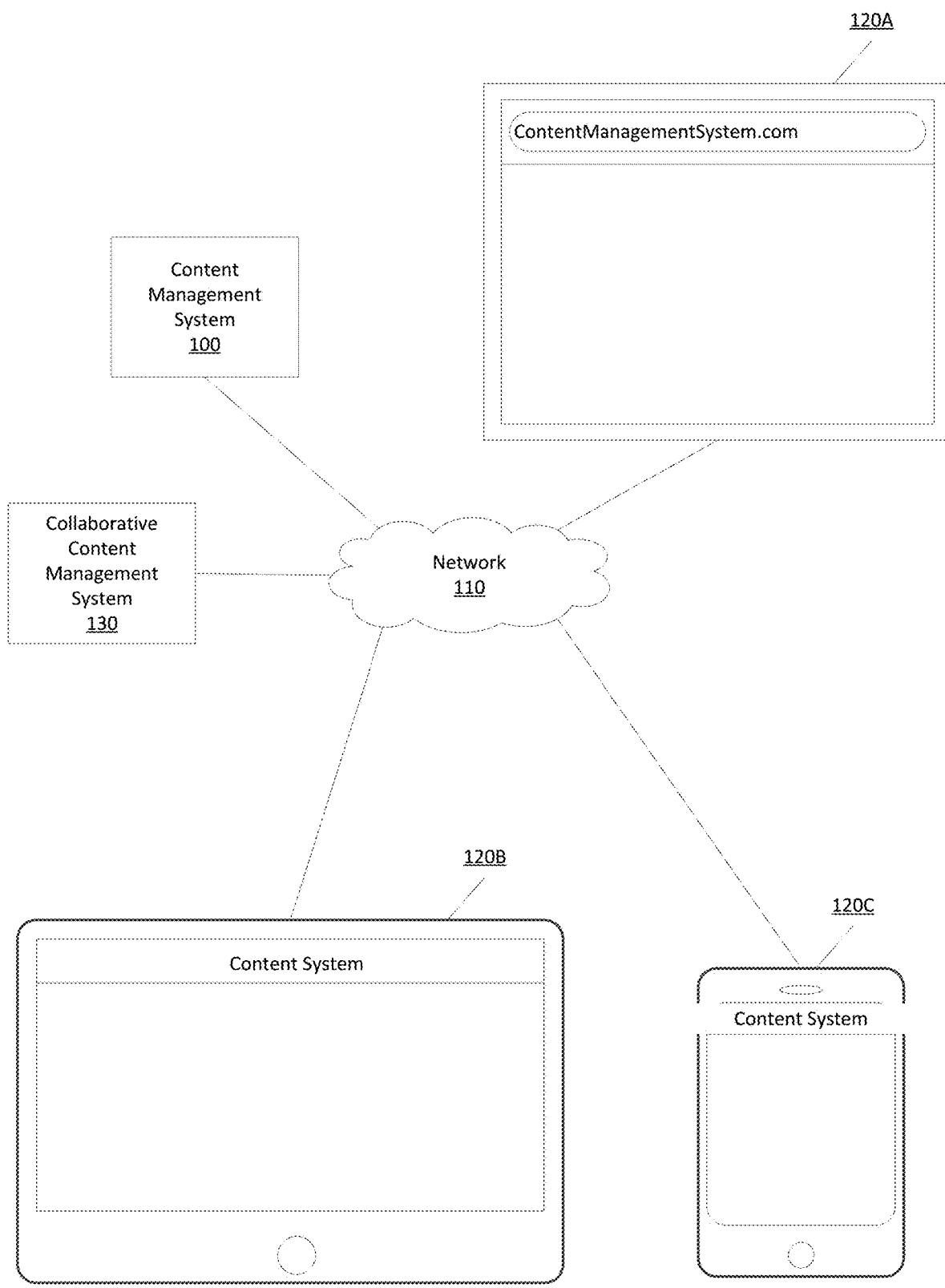
FIG. 1 shows a diagram of a system environment of a content management system and a collaborative content management system, according to example embodiments.

FIG. 1 shows a system environment including content management system 100, collaborative content management system 130, and client devices 120a, 120b, and 120c (collectively or individually "120"). Content management system 100 provides functionality for sharing content items with one or more client devices 120 and synchronizing content items between content management system 100 and one or more client devices 120.

The content stored by content management system 100 can include any type of content items, such as documents, spreadsheets, collaborative content items, text files, audio files, image files, video files, webpages, executable files, binary files, placeholder files that reference other content items, etc. In some implementations, a content item can be a portion of another content item, such as an image that is included in a document. Content items can also include collections, such as folders, namespaces, playlists, albums, etc., that group other content items together. The content stored by content management system 100 may be organized in one configuration in folders, tables, or in other database structures (e.g., object oriented, key/value etc.).

In some example embodiments, the content stored by content management system 100 includes content items created by using third party applications, e.g., word processors, video and image editors, database management systems, spreadsheet applications, code editors, and so forth, which are independent of content management system 100.

In some example embodiments, content stored by content management system 100 includes content items, e.g., collaborative content items, created using a collaborative interface provided by collaborative content management system 130. In various implementations, collaborative content items can be stored by collaborative content item management system 130, with content management system 100, or external to content management system 100. A collaborative interface can provide an interactive content item collaborative platform whereby multiple users can simultaneously create and edit collaborative content items, comment in the collaborative content items, and manage tasks within the collaborative content items.

Users may create accounts at content management system 100 and store content thereon by sending such content from client device 120 to content management system 100. The content can be provided by users and associated with user accounts that may have various privileges. For example, privileges can include permissions to: see content item titles, see other metadata for the content item (e.g. location data, access history, version history, creation/modification dates, comments, file hierarchies, etc.), read content item contents, modify content item metadata, modify content of a content item, comment on a content item, read comments by others on a content item, or grant or remove content item permissions for other users.

Client devices 120 communicate with content management system 100 and collaborative content management system 130 through network 110. The network may be any suitable communications network for data transmission. In some example embodiments, network 110 is the Internet and uses standard communications technologies and/or protocols. Thus, network 110 can include links using technologies such as Ethernet, 802.11, worldwide interoperability for microwave access (WiMAX), 3G, 4G, digital subscriber line (DSL), asynchronous transfer mode (ATM), InfiniBand, PCI Express Advanced Switching, etc. Similarly, the networking protocols used on network 110 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over network 110 can be represented using technologies and/or formats including the hypertext markup language (HTML), the extensible markup language (XML), JavaScript Object Notation (JSON), etc. In addition, all or some of links can be encrypted using conventional encryption technologies such as the secure sockets layer (SSL), transport layer security (TLS), virtual private networks (VPNs), Internet Protocol security (IPsec), etc. In some example embodiments, the entities use custom and/or dedicated data communications technologies instead of, or in addition to, the ones described above.

In some example embodiments, content management system 100 and collaborative content management system 130 are combined into a single system. The system may include one or more servers configured to provide the functionality discussed herein for the systems 100 and 130.

Client Device

Figure 2:
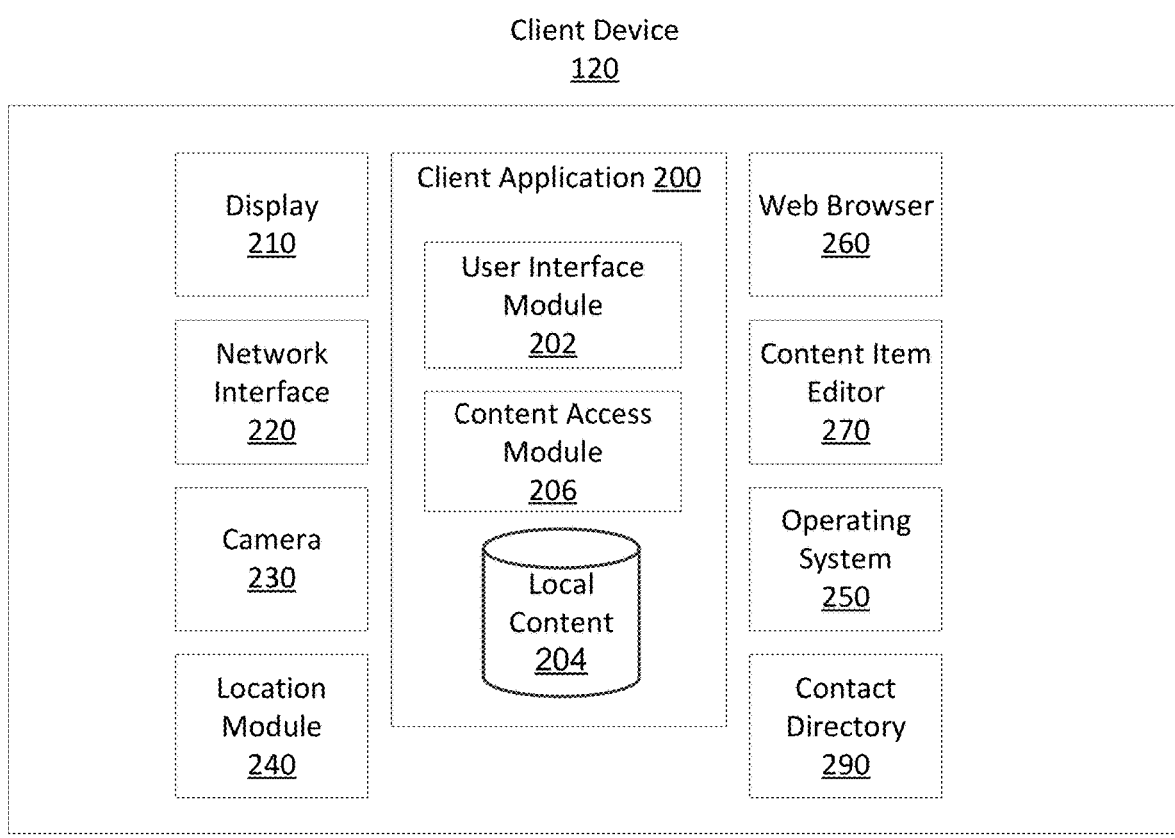
FIG. 2 shows a block diagram of components of a client device, according to example embodiments.

FIG. 2 shows a block diagram of the components of a client device 120 according to example embodiments. Client devices 120 generally include devices and modules for communicating with content management system 100 and a user of client device 120. Client device 120 includes display 210 for providing information to the user, and in certain client devices 120 includes a touchscreen. Client device 120 also includes network interface 220 for communicating with content management system 100 via network 110. There are additional components that may be included in client device 120 but that are not shown, for example, one or more computer processors, local fixed memory (RAM and ROM), as well as optionally removable memory (e.g., SD-card), power sources, and audio-video outputs.

In certain example embodiments, client device 120 includes additional components such as camera 230 and location module 240. Location module 240 determines the location of client device 120, using, for example, a global positioning satellite signal, cellular tower triangulation, or other methods. Location module 240 may be used by client application 200 to obtain location data and add the location data to metadata about a content item.

Client devices 120 maintain various types of components and modules for operating the client device and accessing content management system 100. The software modules can include operating system 250 or a collaborative content item editor 270. Collaborative content item editor 270 is configured for creating, viewing and modifying collaborative content items such as text documents, code files, mixed media files (e.g., text and graphics), presentations or the like. Operating system 250 on each device provides a local file management system and executes the various software modules such as content management system client application 200 and collaborative content item editor 270. A contact directory 290 stores information on the user's contacts, such as name, telephone numbers, company, email addresses, physical address, website URLs, and the like.

Client devices 120 access content management system 100 and collaborative content management system 130 in a variety of ways. Client device 120 may access these systems through a native application or software module, such as content management system client application 200. Client device 120 may also access content management system 100 through web browser 260. As an alternative, the client application 200 may integrate access to content management system 100 with the local file management system provided by operating system 250. When access to content management system 100 is integrated in the local file management system, a file organization scheme maintained at the content management system is represented at the client device 120 as a local file structure by operating system 250 in conjunction with client application 200.

Client application 200 manages access to content management system 100 and collaborative content management system 130. Client application 200 includes user interface module 202 that generates an interface to the content accessed by client application 200 and is one means for performing this function. The generated interface is provided to the user by display 210. Client application 200 may store content accessed from a content storage at content management system 100 in local content 204. While represented here as within client application 200, local content 204 may be stored with other data for client device 120 in non-volatile storage. When local content 204 is stored this way, the content is available to the user and other applications or modules, such as collaborative content item editor 270, when client application 200 is not in communication with content management system 100. Content access module 206 manages updates to local content 204 and communicates with content management system 100 to synchronize content modified by client device 120 with content maintained on content management system 100, and is one means for performing this function. Client application 200 may take various forms, such as a stand-alone application, an application plug-in, or a browser extension.

Content Management System

Figure 3:
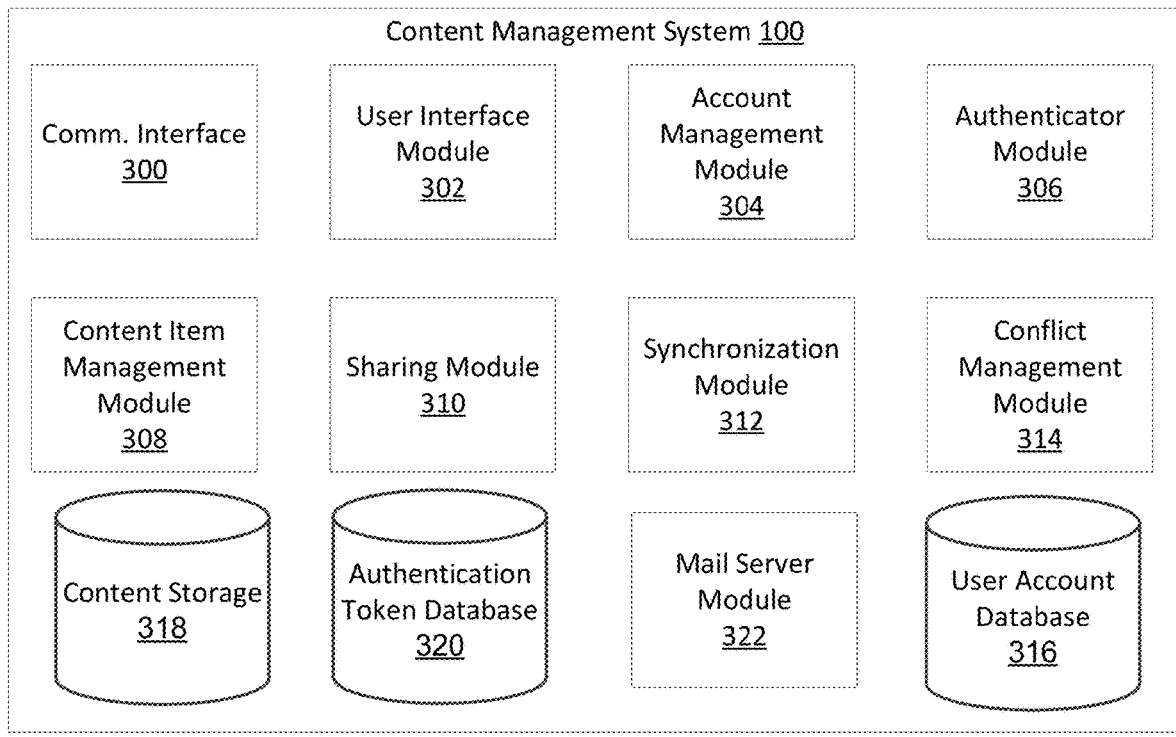
FIG. 3 shows a block diagram of a content management system, according to example embodiments.

FIG. 3 shows a block diagram of the content management system 100 according to example embodiments. To facilitate the various content management services, a user can create an account with content management system 100. The account information can be maintained in user account database 316, and is one means for performing this function. User account database 316 can store profile information for registered users. In some cases, the only personal information in the user profile is a username and/or email address. However, content management system 100 can also be configured to accept additional user information, such as password recovery information, demographics information, payment information, and other details. Each user is associated with a userID and a user name. For purposes of convenience, references herein to information such as collaborative content items or other data being "associated" with a user are understood to mean an association between a collaborative content item and either of the above forms of user identifier for the user. Similarly, data processing operations on collaborative content items and users are understood to be operations performed on derivative identifiers such as collaborativeContentItemID and userIDs. For example, a user may be associated with a collaborative content item by storing the information linking the userID and the collaborativeContentItemID in a table, file, or other storage formats. For example, a database table organized by collaborativeContentItemIDs can include a column listing the userID of each user associated with the collaborative content item. As another example, for each userID, a file can list a set of collaborativeContentItemID associated with the user. As another example, a single file can list key values pairs such as <userID, collaborativeContentItemID> representing the association between an individual user and a collaborative content item. The same types of mechanisms can be used to associate users with comments, threads, text elements, formatting attributes, and the like.

User account database 316 can also include account management information, such as account type, e.g. free or paid; usage information for each user, e.g., file usage history; maximum storage space authorized; storage space used; content storage locations; security settings; personal configuration settings; content sharing data; etc. Account management module 304 can be configured to update and/or obtain user account details in user account database 316. Account management module 304 can be configured to interact with any number of other modules in content management system 100.

An account can be used to store content items, such as collaborative content items, audio files, video files, etc., from one or more client devices associated with the account. Content items can be shared with multiple users and/or user accounts. In some implementations, sharing a content item can include associating, using sharing module 310, the content item with two or more user accounts and providing for user permissions so that a user that has authenticated into one of the associated user accounts has a specified level of access to the content item. That is, the content items can be shared across multiple client devices of varying type, capabilities, operating systems, etc. The content items can also be shared across varying types of user accounts.

Individual users can be assigned different access privileges to a content item shared with them, as discussed above. In some cases, a user's permissions for a content item can be explicitly set for that user. A user's permissions can also be set based on: a type or category associated with the user (e.g., elevated permissions for administrator users or manager), the user's inclusion in a group or being identified as part of an organization (e.g., specified permissions for all members of a particular team), and/or a mechanism or context of a user's accesses to a content item (e.g., different permissions based on where the user is, what network the user is on, what type of program or API the user is accessing, whether the user clicked a link to the content item, etc.). Additionally, permissions can be set by default for users, user types/groups, or for various access mechanisms and contexts.

In some implementations, shared content items can be accessible to a recipient user without requiring authentication into a user account. This can include sharing module 310 providing access to a content item through activation of a link associated with the content item or providing access through a globally accessible shared folder.

The content can be stored in content storage 318, which is one means for performing this function. Content storage 318 can be a storage device, multiple storage devices, or a server. Alternatively, content storage 318 can be a cloud storage provider or network storage accessible via one or more communications networks. In one configuration, content management system 100 stores the content items in the same organizational structure as they appear on the client device. However, content management system 100 can store the content items in its own order, arrangement, or hierarchy.

Content storage 318 can also store metadata describing content items, content item types, and the relationship of content items to various accounts, folders, or groups. The metadata for a content item can be stored as part of the content item or can be stored separately. In one configuration, each content item stored in content storage 318 can be assigned a system-wide unique identifier.

Content storage 318 can decrease the amount of storage space required by identifying duplicate files or duplicate segments of files. Instead of storing multiple copies of an identical content item, content storage 318 can store a single copy and then use a pointer or other mechanism to link the duplicates to the single copy. Similarly, content storage 318 stores files using a file version control mechanism that tracks changes to files, different versions of files (such as a diverging version tree), and a change history. The change history can include a set of changes that, when applied to the original file version, produces the changed file version.

Content management system 100 automatically synchronizes content from one or more client devices, using synchronization module 312, which is one means for performing this function. The synchronization is platform agnostic. That is, the content is synchronized across multiple client devices 120 of varying type, capabilities, operating systems, etc. For example, client application 200 synchronizes, via synchronization module 312 at content management system 100, content in client device 120's file system with the content in an associated user account on system 100. Client application 200 synchronizes any changes to content in a designated folder and its sub-folders with the synchronization module 312. Such changes include new, deleted, modified, copied, or moved files or folders. Synchronization module 312 also provides any changes to content associated with client device 120 to client application 200. This synchronizes the local content at client device 120 with the content items at content management system 100.

Conflict management module 314 determines whether there are any discrepancies between versions of a content item located at different client devices 120. For example, when a content item is modified at one client device and a second client device, differing versions of the content item may exist at each client device. Synchronization module 312 determines such versioning conflicts, for example by identifying the modification time of the content item modifications. Conflict management module 314 resolves the conflict between versions by any suitable means, such as by merging the versions, or by notifying the client device of the later-submitted version.

A user can also view or manipulate content via a web interface generated by user interface module 302. For example, the user can navigate in web browser 260 to a web address provided by content management system 100. Changes or updates to content in content storage 318 made through the web interface, such as uploading a new version of a file, are synchronized back to other client devices 120 associated with the user's account. Multiple client devices 120 may be associated with a single account and files in the account are synchronized between each of the multiple client devices 120.

Content management system 100 includes communications interface 300 for interfacing with various client devices 120, and with other content and/or service providers via an Application Programming Interface (API), which is one means for performing this function. Certain software applications access content storage 318 via an API on behalf of a user. For example, a software package, such as an app on a smartphone or tablet computing device, can programmatically make calls directly to content management system 100, when a user provides credentials, to read, write, create, delete, share, or otherwise manipulate content. Similarly, the API can allow users to access all or part of content storage 318 through a web site.

Content management system 100 can also include authenticator module 306, which verifies user credentials, security tokens, API calls, specific client devices, etc., to determine whether access to requested content items is authorized, and is one means for performing this function. Authenticator module 306 can generate one-time use authentication tokens for a user account. Authenticator module 306 assigns an expiration period or date to each authentication token. In addition to sending the authentication tokens to requesting client devices, authenticator module 306 can store generated authentication tokens in authentication token database 320. After receiving a request to validate an authentication token, authenticator module 306 checks authentication token database 320 for a matching authentication token assigned to the user. Once the authenticator module 306 identifies a matching authentication token, authenticator module 306 determines if the matching authentication token is still valid. For example, authenticator module 306 verifies that the authentication token has not expired or was not marked as used or invalid. After validating an authentication token, authenticator module 306 may invalidate the matching authentication token, such as a single-use token. For example, authenticator module 306 can mark the matching authentication token as used or invalid, or delete the matching authentication token from authentication token database 320.

In some example embodiments, content management system 100 includes a content management module 308 for maintaining a content directory that identifies the location of each content item in content storage 318, and allows client applications to request access to content items in the storage 318, and which is one means for performing this function. A content entry in the content directory can also include a content pointer that identifies the location of the content item in content storage 318. For example, the content entry can include a content pointer designating the storage address of the content item in memory. In some example embodiments, the content entry includes multiple content pointers that point to multiple locations, each of which contains a portion of the content item.

In addition to a content path and content pointer, a content entry in some configurations also includes user account identifier that identifies the user account that has access to the content item. In some example embodiments, multiple user account identifiers can be associated with a single content entry indicating that the content item has shared access by the multiple user accounts.

In some example embodiments, the content management system 100 can include a mail server module 322. The mail server module 322 can send (and receive) collaborative content items to (and from) other client devices using the collaborative content management system 100. The mail server module can also be used to send and receive messages between users in the content management system.

Collaborative Content Management System

Figure 4:
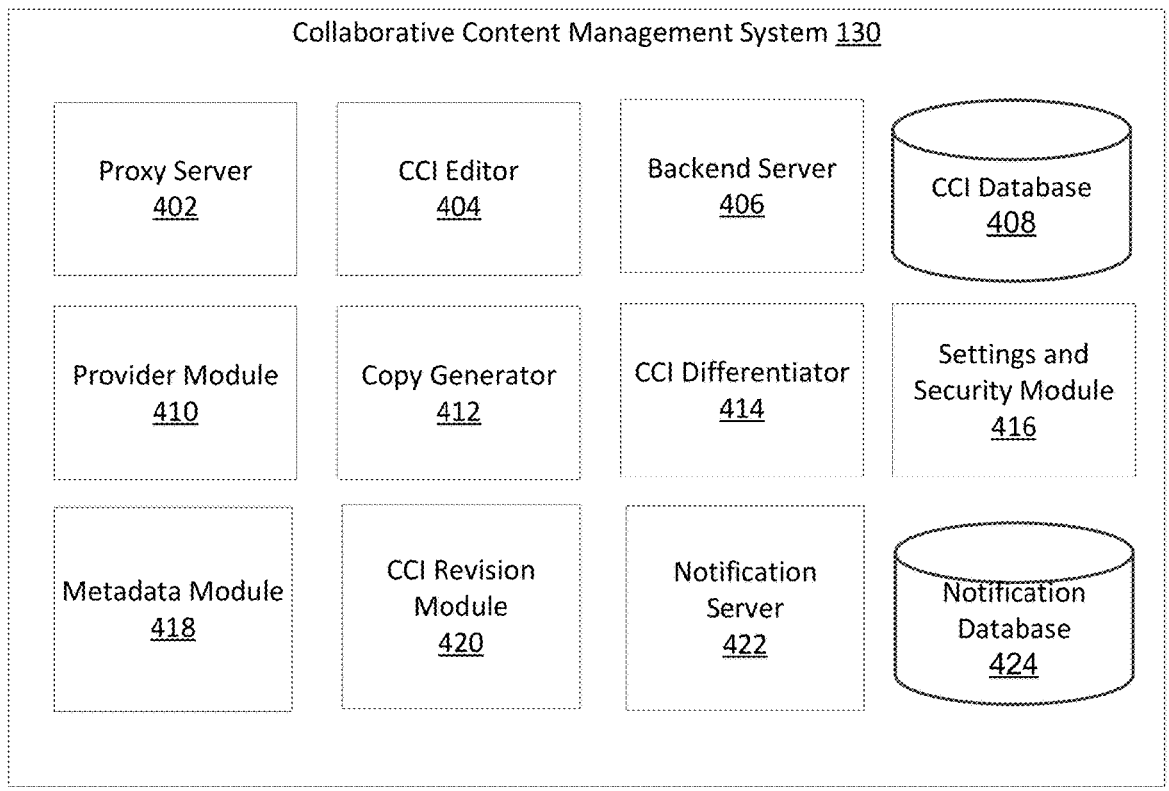
FIG. 4 shows a block diagram of a collaborative content management system, according to example embodiments.

FIG. 4 shows a block diagram of the collaborative content management system 130, according to example embodiments. Collaborative content items can be files that users can create and edit using a collaborative content items editor 270 and can contain collaborative content item elements. Collaborative content item elements may include any type of content such as text; images, animations, videos, audio, or other multi-media; tables; lists; references to external content; programming code; tasks; tags or labels; comments; or any other type of content. Collaborative content item elements can be associated with an author identifier, attributes, interaction information, comments, sharing users, etc. Collaborative content item elements can be stored as database entities, which allows for searching and retrieving the collaborative content items. As with other types of content items, collaborative content items may be shared and synchronized with multiple users and client devices 120, using sharing 310 and synchronization 312 modules of content management system 100. Users operate client devices 120 to create and edit collaborative content items, and to share collaborative content items with other users of client devices 120. Changes to a collaborative content item by one client device 120 are propagated to other client devices 120 of users associated with that collaborative content item.

In example embodiments of FIG. 1, collaborative content management system 130 is shown as separate from content management system 100 and can communicate with it to obtain its services. In other example embodiments, collaborative content management system 130 is a subsystem of the component of content management system 100 that provides sharing and collaborative services for various types of content items. User account database 316 and authentication token database 320 from content management system 100 are used for accessing collaborative content management system 130 described herein.

Collaborative content management system 130 can include various servers for managing access and edits to collaborative content items and for managing notifications about certain changes made to collaborative content items. Collaborative content management system 130 can include proxy server 402, collaborative content item editor 404, backend server 406, and collaborative content item database 408, access link module 410, copy generator 412, collaborative content item differentiator 414, settings module 416, metadata module 418, revision module 420, notification server 422, and notification database 424. Proxy server 402 handles requests from client applications 200 and passes those requests to the collaborative content item editor 404. Collaborative content item editor 404 manages application level requests for client applications 200 for editing and creating collaborative content items, and selectively interacts with backend servers 406 for processing lower level processing tasks on collaborative content items, and interfacing with collaborative content items database 408 as needed. Collaborative content items database 408 contains a plurality of database objects representing collaborative content items, comment threads, and comments. Each of the database objects can be associated with a content pointer indicating the location of each object within the CCI database 408. Notification server 422 detects actions performed on collaborative content items that trigger notifications, creates notifications in notification database 424, and sends notifications to client devices.

Client application 200 sends a request relating to a collaborative content item to proxy server 402. Generally, a request indicates the userID ("UID") of the user, and the collaborativeContentItemID ("NID") of the collaborative content item, and additional contextual information as appropriate, such as the text of the collaborative content item. When proxy server 402 receives the request, the proxy server 402 passes the request to the collaborative content item editor 404. Proxy server 402 also returns a reference to the identified collaborative content items proxy server 402 to client application 200, so the client application can directly communicate with the collaborative content item editor 404 for future requests. In alternative example embodiments, client application 200 initially communicates directly with a specific collaborative content item editor 404 assigned to the userID.

When collaborative content item editor 404 receives a request, it determines whether the request can be executed directly or by a backend server 406. When the request adds, edits, or otherwise modifies a collaborative content item the request is handled by the collaborative content item editor 404. If the request is directed to a database or index inquiry, the request is executed by a backend server 406. For example, a request from client device 120 to view a collaborative content item or obtain a list of collaborative content items responsive to a search term is processed by backend server 406.

The access module 410 receives a request to provide a collaborative content item to a client device. In some example embodiments, the access module generates an access link to the collaborative content item, for instance in response to a request to share the collaborative content item by an author. The access link can be a hyperlink including or associated with the identification information of the CCI (i.e., unique identifier, content pointer, etc.). The hyperlink can also include any type of relevant metadata within the content management system (i.e., author, recipient, time created, etc.). In some example embodiments, the access module can also provide the access link to user accounts via the network 110, while in other example embodiments the access link can be provided or made accessible to a user account and is accessed through a user account via the client device. In some example embodiments, the access link will be a hyperlink to a landing page (e.g., a webpage, a digital store front, an application login, etc.) and activating the hyperlink opens the landing page on a client device. The landing page can allow client devices not associated with a user account to create a user account and access the collaborative content item using the identification information associated with the access link. Additionally, the access link module can insert metadata into the collaborative content item, associate metadata with the collaborative content item, or access metadata associated with the collaborative content item that is requested.

The access module 410 can also provide collaborative content items via other methods. For example, the access module 410 can directly send a collaborative content item to a client device or user account, store a collaborative content item in a database accessible to the client device, interact with any module of the collaborative content management system to provide modified versions of collaborative content items (e.g., the copy generator 412, the CCI differentiator 414, etc.), sending content pointer associated with the collaborative content item, sending metadata associated with the collaborative content item, or any other method of providing collaborative content items between devices in the network. The access module can also provide collaborative content items via a search of the collaborative content item database (i.e., search by a keyword associated with the collaborative content item, the title, or a metadata tag, etc.).

The copy generator 412 can duplicate a collaborative content item. Generally, the copy generator duplicates a collaborative content item when a client device selects an access link associated with the collaborative content item. The copy generator 412 accesses the collaborative content item associated with the access link and creates a derivative copy of the collaborative content item for every request received. The copy generator 412 stores each derivative copy of the collaborative content item in the collaborative content item database 408. Generally, each copy of the collaborative content item that is generated by the copy generator 412 is associated with both the client device from which the request was received and the user account associated with the client device requesting the copy. When the copy of the collaborative content item is generated it can create a new unique identifier and content pointer for the copy of the collaborative content item. Additionally, the copy generator 412 can insert metadata into the collaborative content item, associate metadata with the copied collaborative content item, or access metadata associated with the collaborative content item that was requested to be copied.

The collaborative content item differentiator 414 determines the difference between two collaborative content items. In some example embodiments, the collaborative content item differentiator 414 determines the difference between two collaborative content items when a client device selects an access hyperlink and accesses a collaborative content item that the client device has previously used the copy generator 412 to create a derivative copy. The content item differentiator can indicate the differences between the content elements of the compared collaborative content items. The collaborative content item differentiator 414 can create a collaborative content item that includes the differences between the two collaborative content items, i.e. a differential collaborative content item. In some example embodiments, the collaborative content item differentiator provides the differential collaborative content item to a requesting client device 120. The differentiator 414 can store the differential collaborative content item in the collaborative content item database 408 and generate identification information for the differential collaborative content item. Additionally, the differentiator 414 can insert metadata into the accessed and created collaborative content items, associate metadata with the accessed and created collaborative content item, or access metadata associated with the collaborative content items that were requested to be differentiated.

The settings and security module 416 can manage security during interactions between client devices 120, the content management system 100, and the collaborative content management system 130. Additionally, the settings and security module 416 can manage security during interactions between modules of the collaborative content management system. For example, when a client device 120 attempts to interact within any module of the collaborative content management system 100, the settings and security module 416 can manage the interaction by limiting or disallowing the interaction. Similarly, the settings and security module 416 can limit or disallow interactions between modules of the collaborative content management system 130. Generally, the settings and security module 416 accesses metadata associated with the modules, systems 100 and 130, devices 120, user accounts, and collaborative content items to determine the security actions to take. Security actions can include: requiring authentication of client devices 120 and user accounts, requiring passwords for content items, removing metadata from collaborative content items, preventing collaborative content items from being edited, revised, saved or copied, or any other security similar security action. Additionally, settings and security module can access, add, edit or delete any type of metadata associated with any element of content management system 100, collaborative content management system 130, client devices 120, or collaborative content items.

The metadata module 418 manages metadata within with the collaborative content management system. Generally, metadata can take three forms within the collaborative content management system: internal metadata, external metadata, and device metadata. Internal metadata is metadata within a collaborative content item, external metadata is metadata associated with a CCI but not included or stored within the CCI itself, and device metadata is associated with client devices. At any point the metadata module can manage metadata by changing, adding, or removing metadata.

Some examples of internal metadata can be: identifying information within collaborative content items (e.g., email addresses, names, addresses, phone numbers, social security numbers, account or credit card numbers, etc.); metadata associated with content elements (e.g., location, time created, content element type; content element size; content element duration, etc.); comments associated with content elements (e.g., a comment giving the definition of a word in a collaborative content item and its attribution to the user account that made the comment); or any other metadata that can be contained within a collaborative content item.

Some examples of external metadata can be: content tags indicating categories for the metadata; user accounts associated with a CCI (e.g., author user account, editing user account, accessing user account etc.); historical information (e.g., previous versions, access times, edit times, author times, etc.); security settings; identifying information (e.g., unique identifier, content pointer); collaborative content management system 130 settings; user account settings; or any other metadata that can be associated with the collaborative content item.

Some examples of device metadata can be: device type; device connectivity; device size; device functionality; device sound and display settings; device location; user accounts associated with the device; device security settings; or any other type of metadata that can be associated with a client device 120.

The collaborative content item revision module 420 manages application level requests for client applications 200 for revising differential collaborative content items and selectively interacts with backend servers 406 for processing lower level processing tasks on collaborative content items, and interfacing with collaborative content items database 408 as needed. The revision module can create a revised collaborative content item that is some combination of the content elements from the differential collaborative content item. The revision module 420 can store the revised collaborative content item in the collaborative content item database or provide the revised collaborative content item to a client device 120. Additionally, the revision module 420 can insert metadata into the accessed and created collaborative content items, associate metadata with the accessed and created collaborative content item, or access metadata associated with the collaborative content items that were requested to be differentiated.

Content management system 100 and collaborative content management system 130 may be implemented using a single computer, or a network of computers, including cloud-based computer implementations. The operations of content management system 100 and collaborative content management system 130 as described herein can be controlled through either hardware or through computer programs installed in computer storage and executed by the processors of such server to perform the functions described herein. These systems include other hardware elements necessary for the operations described here, including network interfaces and protocols, input devices for data entry, and output devices for display, printing, or other presentations of data, but which are not described herein. Similarly, conventional elements, such as firewalls, load balancers, collaborative content items servers, failover servers, network management tools and so forth are not shown so as not to obscure the features of the system. Finally, the functions and operations of content management system 100 and collaborative content management system 130 are sufficiently complex as to require implementation on a computer system, and cannot be performed in the human mind simply by mental steps.

Comment Management User Interface

Referring now to FIG. 5A, there is shown an example user interface of a page of a collaborative content item 502 entitled "Draft Speech" in which several comments 504 associated with the collaborative content item have been made. In this example, a collaborative content item 502 is composed of content such as lines of text, which can be arranged such as in paragraph blocks 508, and may include any other form of media, such as images, videos, spreadsheets, executable or interpretable code, and so forth.

Content Level Comments

A collaborative content item 502 can have zero or more content level comments 504. Content level comments can be associated with specific portions of a collaborative content item. The presence of content level comments 504 within the content item may be indicated by underlined (or colored underlined) portions 510 of content, though any other formatting may be used to indicate the presence of a content level comment 504 (e.g., lines connecting the content level comments to the content item, comment numbers in superscript form, highlighting, a "hover over" display indicator etc.). The portion 510 of content with which a content level comment is associated is also called a span. Content level comments 504 can be associated with overlapping spans; the first and second content level comments 504a, 504b are applied to the span "Now we are engaged in a great civil war, testing whether that nation, or any nation so conceived, and so dedicated, can long endure" and the third comment 504c is associated with just the span "This we may, in all propriety do."

The content level comments 504 can be arranged in a comment pane 512 positioned to the side of the body of the collaborative content item 502. Each content level comment 504 has an author 514 (indicated by user name) and a creation date and time. A collection of comments that together form an exchange between users with respect to a single span is a thread 518. Threads are displayed proximate the span that is associated with the thread. In the example of FIG. 5A, there are three threads, 518a, 518b, and 518c; thread 518a has a total of four comments (two shown, and "2 more comments" as indicated) and the other threads have one comment each.

A user may create a new comment or reply to existing comment. To create a comment, a user selects a span in the content item, and activates a comment function, for example via button 522, menu or other input. The new comment 504 is displayed in the comment pane 512, indicating the user name and creation time, and the user may then enter text for the comment therein. The user can apply text formatting to the text of the comment as done for formatting the text of the collaborative content item. A user may also create a comment to include in a thread by entering text into a reply field 516 in one of the comments 504, such as the most recent comment in a thread 518.

When a user opens a collaborative content item initially, the comment pane 512 can be closed such that the comments therein are hidden. The user can activate the comment pane 512 to show the content level comments by selecting text (e.g., double clicking) that is formatted or otherwise indicated as having an associated comment. In some implementations, the comment pane 512 can be visible when a collaborative content item is opened. The pane 512 includes a counter 524 of the current number of content level comments in the collaborative content item that are visible to the user. Each comment can have a state, as to whether the comment is active or resolved. The counter 524 serves as a menu that the user can select from to filter the comments so as to show all comments, active comments or resolved comments.

A collaborative content item may also include a share icon 526 that allows a user to share the collaborative content item with other users of the content management system 100. Upon clicking on the share icon 526 a sharing interface is displayed to the user. The sharing interface can include a field for adding user names or email addresses to the list of users with which the collaborative content item is to be shared. The sharing interface may also include a text field to allow the sharing user to send a message to users receiving the request to share the collaborative content item.

User Primitives

In some example embodiments, the collaborative content management system 130 is configured to recognize particular text patterns as functional primitives that activate various functions of the collaborative content management system 130. One type of functional primitive is a user primitive. A user primitive is indicated by a predetermined token followed by the user name of a user. The user primitive is used in the text or comments of a collaborative content item to programmatically associate a specific user with the collaborative content item or comment. Colloquially, the appearance of a user primitive identifying a user name is called a mention of a user.

In some example embodiments, the user primitive takes the form of @username where the "@" symbols is a predetermined token indicates to the collaborative content management system 130 that the following string username is the user name of a system user. Referring to FIG. 5A, several examples of user primitives 520 are illustrated. First in the text of the collaborative content item, the first sentence includes the user primitives "@Bill_Seward" and "@John_Hay. The user primitive "@Bill_Seward" is also shown in the text of comment 504d. The collaborative content management system 130 recognizes these primitives as it processes the text of the collaborative content item and comments.

When a user primitive indicating a specific user appears in the span for a thread, or the text of a comment, the collaborative content management system 130 includes the userID for the indicated user in the audience for thread containing the comment. This allows the mentioned user to see the entire thread in which they are mentioned when accessing the collaborative content item (since access to the thread when opening a collaborative content item is determined by presence of a user's ID in the audience), as well for a mechanism to notify the user, as next described.

In some example embodiments, when a user primitive occurs elsewhere in the collaborative content item, but outside of the span for the thread, the userID for the mentioned user is included in the audience. For example, if a user is mentioned in the same paragraph as the span for a thread, the userID for the user is included in the audience.

Contextual Primitives

In addition to user primitives, the collaborative content management system 130 may also support contextual primitives. Contextual primitives function in a similar way to user primitives, however, instead of adding a single user to the audience of a thread, contextual primitives can add a group of users, or user(s) assigned to a specific role (e.g., owner, editor, etc.), to the audience of a thread using document context. A contextual primitive is indicated by a predetermined token followed by a predetermined text string. Each predefined text string may incur different functionality from the collaborative content management system 130. A user inserts the contextual primitive as they are editing the content item.

In some implementations, including the @doc primitive can cause every user with access to the collaborative content item to be included in the audience of a thread that includes the primitive. An algorithm to achieve this functionality is as follows. The collaborative content management system 130 detects the "@doc" text string in the span of a thread or in a comment content and accesses the collaborative content item index of the collaborative content item database 408. The collaborative content management system 130 determines the userIDs with viewing privileges for the collaborative content item according to the collaborative content item index and adds those userIDs to the audience_list for the thread. Alternatively, as discussed below, the system can include an entry in the collaborative content item audience list indicating that multiple users such as all users, authenticated users, users that are part of a particular group, etc., should be included as audience members. When the collaborative content item is subsequently accessed, the thread including the "@doc" primitive will be visible to all users viewing the collaborative content item. Additionally, any notification generating activity in the thread will be reported to all users in the collaborative content item.

In some example embodiments, the "@doc" primitive is dynamic such that any users that are added to the collaborative content item even after the thread has been created will be able to view the comment thread. This may be accomplished by reevaluating the span of a thread and the comment text of a thread each time the collaborative content item is compiled. Alternatively, instead of adding userIDs to the audience_list of a thread directly, the collaborative content management system 130 may create a special ID value indicating that the "@doc" primitive has been used. Therefore, during compilation of the collaborative content item, the collaborative content management system 130 checks to see if a particular thread should be displayed to a viewing user by referencing the audience_list of the thread. If the collaborative content management system 130 detects the special ID associated with the "@doc" primitive it will reference the collaborative content item database 408 to determine which users have viewing permissions. If the user ID of the current user is included in the collaborative content item database 408 then the collaborative content management system 130 displays the thread to the current user.

In addition the collaborative content item audience primitive, other contextual primitives may be implemented:

The "@folder" primitive informs the collaborative content management system 130 that all users with access to the folder that includes the collaborative content item should be able to view the thread. In this case, some of the users that have access to the folder may not have access to the collaborative content item. In this case, the collaborative content management system 130 may grant all users with access to the folder access to the collaborative content item, provide a separate interface for users without access to the collaborative content item to view the thread, or it may provide the users without access to the collaborative content item with notifications regarding the thread over email.

The "@editing" primitive indicates that all users with editing access to the collaborative content item are to be included in the audience for a thread. The collaborative content management system 130 parses this in the same way as the "@doc" primitive. However, instead of retrieving all users associated with the collaborative content item in the collaborative content item index only users with editing access are added to the audience_list for the thread. The "@sharing" primitive (only users with sharing privileges are added to the audience_list) functionality is implemented in a similar manner.

The "@threads" primitive adds all users that have participated in threads in the collaborative content item already to the audience_list of the current thread. To accomplish this, upon detecting the "@threads" primitive the collaborative content management system 130 accesses each thread object associated with the collaborativeContentItemID and adds any users listed in the audience_list of those threads the audience list of the current thread.

Depending on the example embodiments, the specific text string associated with the primitive may be different. A user may also define their own contextual primitive using the client application to select users, categories of users, and contextual categories of users to be included in the primitive. Additionally, and contextual primitive may be made dynamic using a special ID in the audience_list which triggers a reevaluation of the audience list during compilation of the collaborative content item.

File-Level Comment Interfaces

The collaborative content management system 130 also enables file-level commenting and may utilize a number of user interfaces depending on the example embodiments. A file-level comment is associated with the file itself and persists with the file until the file is deleted or the comment itself is deleted. This allows for conversations between users to occur on a file-level that persists with each iteration on the file. The methods described herein, also allow for the simultaneous display of the collaborative content item and file-level comments so a user can review the collaborative content item and make comments on the collaborative content item without having to change windows. File-level comments have many of the same characteristics as the content level comments and rely on the same underlying data structure. However, file-level comments are not associated with a span of the collaborative content item and are instead associated with the entirety of the content item. Despite these differences, file-level comments may be used to form threads and have an associated author, creation time and date, which may be displayed in a similar fashion as in content level comments depending on the example embodiments.

Because file-level comments are not associated with a particular span of the collaborative content item, different UI elements may be used to display the file-level comments. FIG. 5B illustrates example embodiments for creating and displaying file-level comments.

FIG. 5B shows an example user interface with a file-level comment associated with the title of the collaborative content item. FIG. 5B displays the same six comments and four threads as in FIG. 5A, with the addition of a file-level comment 528. The file-level comment is displayed alongside the content level comments in the comment pane 512. Instead of being for a particular span in the collaborative content item, as with the content level comments, the file-level comment 528 is associated with the entire document, and is indicated in the collaborative content item by visually distinguishing features 531, such as formatting or highlighting, borders or the like to the title of the collaborative content item 530. Optionally, the same visually distinguishing features can be applied to the comment itself, so that the user knows that which comments are associated with the file and which with specific spans of the content item. FIG. 5B also illustrates the use of a file-level primitive 532, "@file", to indicate that a comment is file-level comment rather than a content level comment.

Spreadsheet Overview

Figure 6:
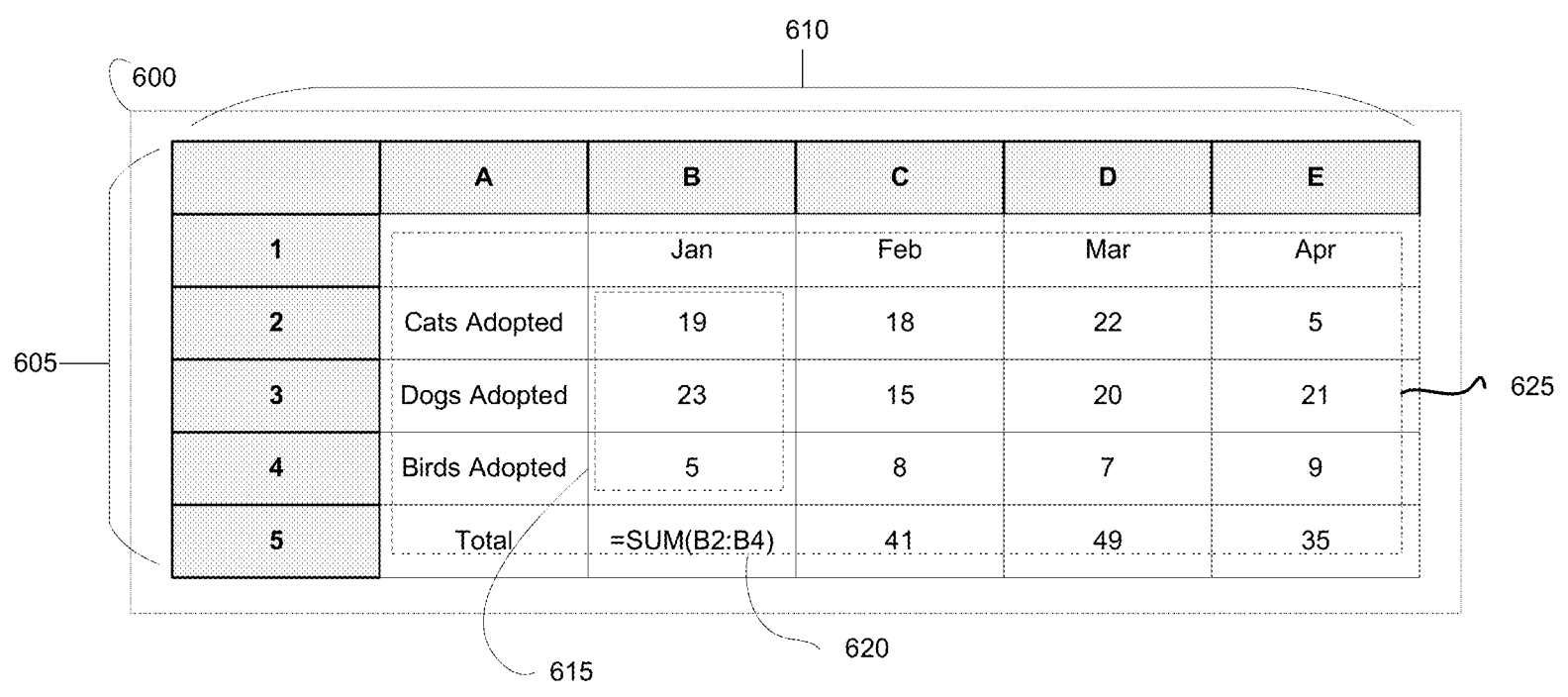

FIG. 6 shows an example portion of a spreadsheet. The spreadsheet 600 of FIG. 6 includes cells 625 that are each associated with coordinates within the spreadsheet including a row of the set of rows 605 and a column of the set of columns 610. In the example embodiments of FIG. 6, the rows 605 are represented by numbers ("1", "2", "3", etc.) and the columns are represented by letters ("A", "B", "C", etc.) Accordingly, each cell of the spreadsheet 600 may be referred to herein using the row and the column corresponding to the cell. For example, the cell B2 in the example embodiments of FIG. 6 includes the value "19". The content included within cells 625 can include any type of data, such as text data, audio data, image data, video data, URLs, structured data, unstructured data, and the like. Likewise, the cells 625 can include additional elements that may be visible (such as buttons, switches, dials, or other interactive elements), that may be invisible (such as metadata, formulas, executable files, binary files, placeholder files, and the like), or that may be related to formatting (such as cell height or width, cell background color, text color, font type, and the like).

As noted above, one or more cells 625 can be associated with formulas. For instance, a value included within a first cell can be the result of a formula operating on values included within a second cell and a third cell. In such instances, if a value within the second or third cell changes, the value included within the first cell may change. The value included within the first cell can be referred to as dependent on the values within the second cell and third cell by virtue of the formula corresponding to the three cells. The spreadsheet 600 can include any suitable formula, including SUM, STDDEV, MEAN, MODE, and the like. The formulas included within the spreadsheet can be selected by a user, for instance from a formula library associated with spreadsheet 600 or programmed by the user. One or more pivot tables, graphs, forming tables, or any suitable data visualization can be generated based on data stored within the spreadsheet 600 and displayed within an interface corresponding to the spreadsheet 600 or another document or program.

In the example shown in FIG. 6, cells B1, C1, D1, and E1 are associated with the months "January", "February", "March", and "April", respectively. Likewise, cells A2, A3, and A4 are associated with the categories "Cats Adopted", "Dogs Adopted", and "Birds Adopted", respectively. Each cell within B2 through E2 includes a number representative of a number of cats adopted within a month corresponding to the column of the cell. Similarly, each cell in B3 through E3 and B4 through E4 includes a number representative of a number of a corresponding animal adopted within a corresponding month. The cells of row 5 include a value representative of total number of animals adopted in each month.

The spreadsheet 600 includes a formula 620. A user can select a set of cells (such as the cells 615, including cell B2, B3, and B4), can enter a formula (such as the SUM formula 620), can enter a target cell (such as the cell B5), and the resulting value included within B5 is the sum of the values included within cells B2, B3, and B4. In the example embodiments of FIG. 6, the value included within cell B5 (after the formula 620 is entered) is 46. However, if the values included within any of cells B2 through B4 were changed, the value included within cell B5 will change. It should be appreciated that although example spreadsheet functionality is described with respect to FIG. 6, in practice the spreadsheets described herein can include any suitable spreadsheet functionality of the art.

Embedding Spreadsheet Portions into Content Items

A collaborative content management system may allow a first type of document to be embedded in a second type of document. For instance, all or part of a spreadsheet can be embedded within a word processing document. However, when at least a portion of a spreadsheet is embedded in a word processing document and a first user makes an edit to the word processing document in one or more of the embedded cells and the edit is not reflected in the spreadsheet stored in the collaborative content management system, then a second user accessing the spreadsheet stored in the collaborative content management system may not see the edit made by the first user. This can result in multiple document versions, and can cause confusion between the users. Updating the spreadsheet stored by the collaborative content management system based on a received edit to the portion of the spreadsheet embedded in the word processing document can prevent such confusion.

Figure 7:
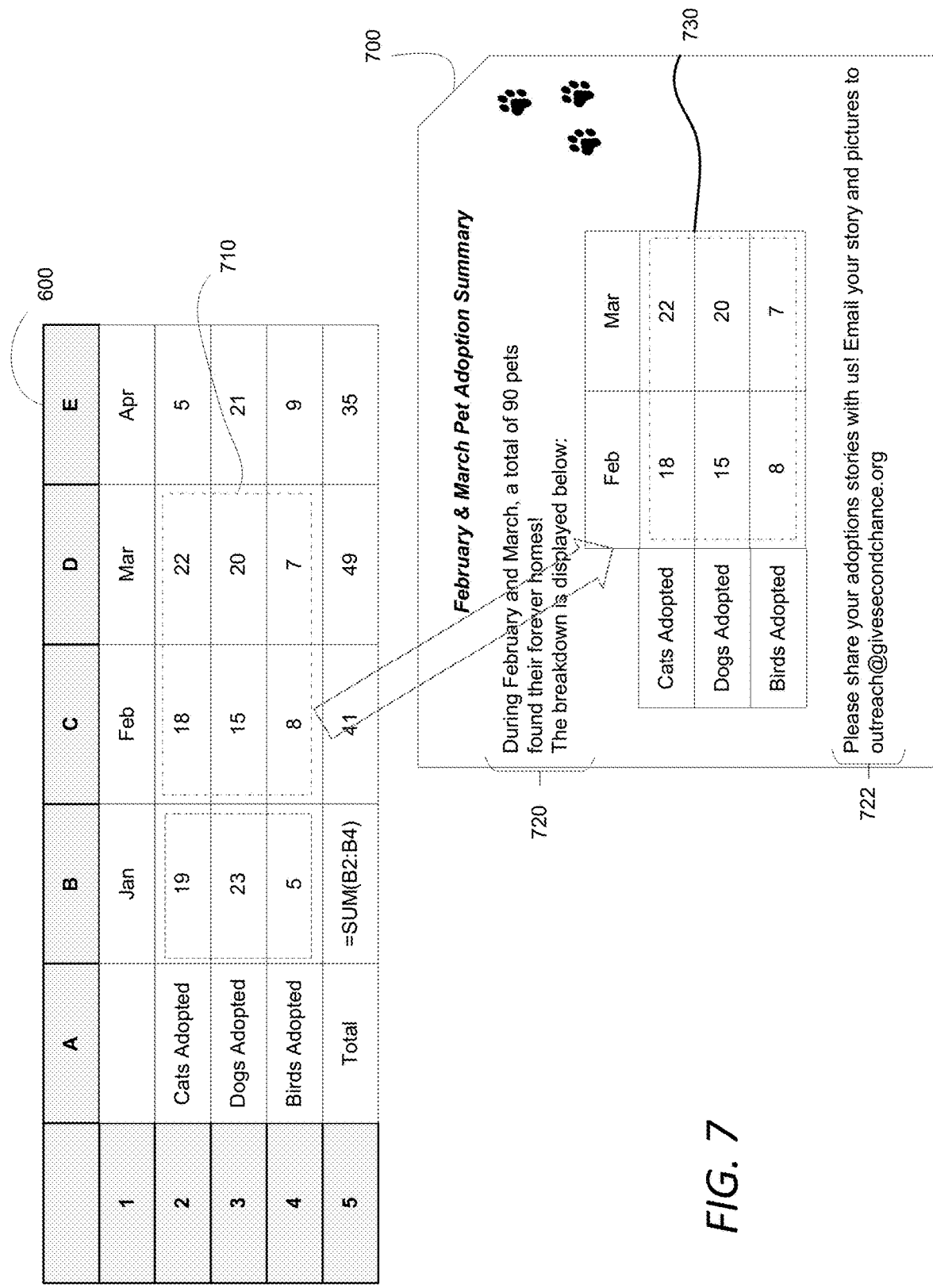
FIG. 7 shows a selected portion of a spreadsheet embedded in a collaborative content item, according to example embodiments.

FIG. 7 shows a selected portion of a spreadsheet embedded in a collaborative content item. The collaborative content item 700 is a document that enables different types of data to be inserted within the document while maintaining the structure of the data. One such data type is a set of spreadsheet cells. In the example embodiments of FIG. 7, a portion 710 of the spreadsheet 600, including cells C2 through C4 and D2 through D4, can be selected and embedded in the collaborative content item 700. As shown in FIG. 7, the portion 710 is embedded within the collaborative content item 700 as portion 730. The structure of the spreadsheet portion 710 is maintained (e.g., the cells themselves, the organization of the cells, and the like). In some example embodiments, only the selected cells are embedded within the collaborative content item 700, while in other example embodiments (such as the example embodiments of FIG. 7), the category cells ("Feb", "Mar", "Cats Adopted", "Dogs Adopted", and "Birds Adopted") are also included within the collaborative content item even though they are not themselves selected.

In some example embodiments, the functionality of the spreadsheet is maintained for the embedded spreadsheet portion 730. For instance, if a formula is associated with one or more of the cells of the embedded spreadsheet portion 730, then a change to a value within the one or more cells may cause a value within a target cell (whether included within the embedded spreadsheet portion 730 or not) to change. Likewise, a user may be able to change a height or width of one or more cells within the embedded spreadsheet portion 730, a font or color of data within the cells, a color of the cell themselves, and the like.

In FIG. 7, the embedded spreadsheet portion 730 is included within the collaborative content item 700 between text portions 720 and 722. In such case, the embedded spreadsheet portion 730 allows a user (such as an author or collaborative of the collaborative content item 700) to embed structured data by copying or referencing the spreadsheet portion 710 of the spreadsheet 600. In some example embodiments, the spreadsheet portion 710 is referenced by including one or more of the following in the collaborative content item 700 (for instance, within metadata of the collaborative content item in conjunction with a location within the collaborative content item where the spreadsheet portion will be embedded): a spreadsheet identifier, a spreadsheet location (such as a file directory location or a URL), an identifier for the portion 710, and an identity of each cell corresponding to the portion. This beneficially enables the user to include the structured data referenced and/or introduced by the text 720 without having to create the structured data within the collaborative content item 700 (e.g., from scratch, potentially without the tools available within a spreadsheet program).

The example embodiments described herein enable bi-directional synchronization between the spreadsheet portion 710 and the embedded spreadsheet portion 730. For example, edits made to the spreadsheet portion 710 are implemented in the embedded spreadsheet portion 730 and edits made to the embedded spreadsheet portion 730 are implemented in the spreadsheet portion 710. In some example embodiments, such edits include changes to data or content included within the cells of the spreadsheet portion 710 or the embedded spreadsheet portion 730 and deletion of data within a cell of one or more cells of the spreadsheet portion 710 or the embedded portion 730. In some example embodiments, the edits to cells of the spreadsheet portion 710 or the embedded spreadsheet portion 730 can include changes to metadata associated with the cells; the creation, removal, or modification of one or more formulas associated with the cells; the addition of a row or column to the spreadsheet; the removal of a row or column from the spreadsheet; the shift of one or more cells within the spreadsheet to a new location within the spreadsheet; changes to the dimensions of one or more of the cells; changes to a font, font size, or font color associated with the cells; changes to cell color; or any other change to the cells. In some example embodiments, changes to one of the spreadsheet portion 710 and the embedded spreadsheet 730 are applied to the other in real-time or substantially real-time, while in other example embodiments, the changes are implemented periodically; in response to a request to synchronize the spreadsheet portions from a user, a device, or an application; in response to a triggering event (such as the accessing of the spreadsheet 600 or the collaborative content item 700); or in response to any other suitable criteria.

In a first example embodiment, a first user can select a portion 710 of the spreadsheet from the spreadsheet 600 stored in the collaborative content management system 130 to embed in the collaborative content item 700 as the embedded spreadsheet portion 730. A second user can edit the embedded portion of the spreadsheet 730, for instance by changing the value "18" to "16". In response, the collaborative content management system 130 updates the spreadsheet portion 710 to reflect this edit, for instance by changing the value of cell C2 from "18" to "16". A third user can subsequently change the value of cell D3 from "20" to "19" in the spreadsheet portion 710, and the collaborative content management system 130 can update the embedded spreadsheet portion 730 to change the value "20" to "19".

In a second example embodiment, a first user can embed a portion 710 of the spreadsheet 600 in a collaborative content item 700 stored in the collaborative content management system 130. The collaborative content item 700 can then be opened from a second device by a second user and from a third device by a third user. The first user can edit the embedded portion of the spreadsheet 730, for instant by changing the value "18" to "16" in cell C2 from the first device. The second and third devices are synced to the first device, and the second user and the third user viewing the collaborative content item 700 from their respective devices can see the edit made by the first user in cell C2 within the interface displayed by their respective devices. Likewise, when one of the second user and third user make an edit to the version of the collaborative content item 700 displayed by their device, the versions of the collaborative content item 700 displayed by the devices of the other users are updated to reflect this additional edit.

In a third example embodiment, a first user can embed a portion 710 of the spreadsheet 600 stored in the collaborative content management system 130 within the collaborative content item 700. A second user can access the spreadsheet 600, for instance by opening the spreadsheet on a device such that the spreadsheet portion 710 is visible within an interface displayed by the device. The first user can then make an edit to the embedded spreadsheet portion 730, for instance by changing the dimensions of the cells of the embedded spreadsheet portion from a first set of dimensions to a second set of dimensions. The changes can be implemented by the collaborative content management system 130 to the spreadsheet portion 710 such that the cells of the 710 are changed from the first dimension to the second dimension. In response, the interface displayed by the device of the second user is updated such that the second user can see the changes made by the first user (e.g., the change to the dimensions of the cells of the spreadsheet portion 710).

In some example embodiments, the ability of a user to modify the spreadsheet portion 710 or the embedded spreadsheet portion 730 and have the modifications be reflected on the other of the portions 710 and 730 is defined by a set of permissions corresponding to the spreadsheet 600 or the collaborative content item 700. For example, a first user can embed the portion 710 of the spreadsheet 600 within the collaborative content item 700 as the embedded spreadsheet portion 730. The first user can grant permission to a second user to edit the embedded spreadsheet portion 730, while only granting permission to a third user to view the embedded spreadsheet portion. In such example embodiments, edits made by the second user to the embedded spreadsheet portion 730 are implemented within the spreadsheet portion 710, while edits made by the third user to the embedded spreadsheet portion 730 either aren't allowed, or aren't implemented within the spreadsheet portion 710. It should be noted that in some example embodiments, edit permissions made to the spreadsheet 600 and the collaborative content item 700 are applied to the spreadsheet portion 710 and the embedded spreadsheet portion 730 respectively. For example, if a user is granted permission to edit the collaborative content item 700, then edits made by the user to the embedded spreadsheet portion 730 are implemented within the spreadsheet portion 710. However, if the user is only granted permission to view the collaborative content item 700, then the user is unable to edit the embedded spreadsheet portion 730, or edits to the embedded spreadsheet portion by the second user are not implemented within the spreadsheet portion 710.

Figure 8:
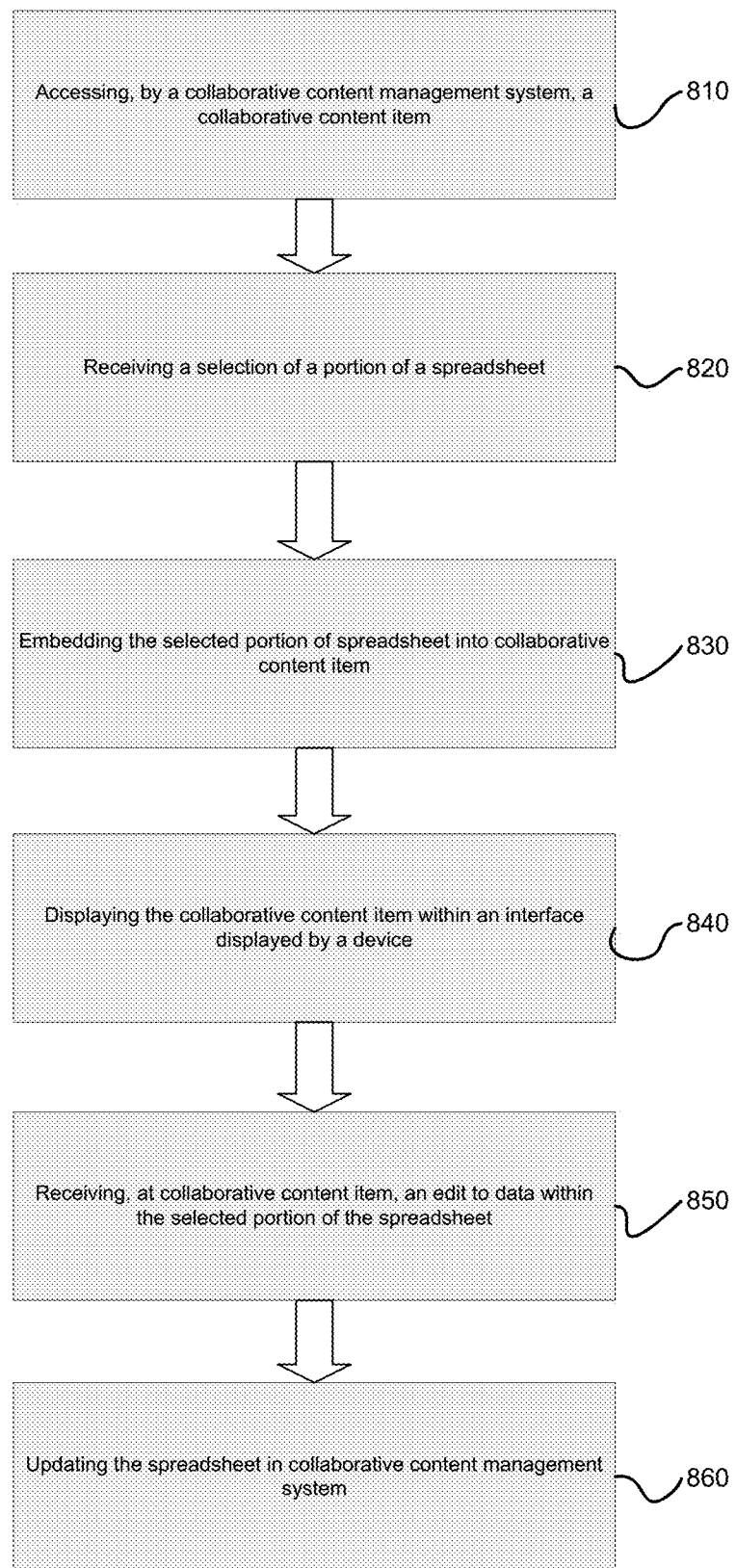
FIG. 8 is a flow chart that illustrates a process of embedding a selected portion of a spreadsheet in a collaborative content item, according to example embodiments.

FIG. 8 is a flow chart that illustrates a process of embedding a selected portion of a spreadsheet in a collaborative content item. In the embodiment of FIG. 8, a collaborative content item is accessed 810 by a collaborative content management system. The collaborative content management system receives 820 a selection of a portion of a spreadsheet. The selected portion of the spreadsheet is embedded 830 into the accessed collaborative content item. The collaborative content management system displays 840 the collaborative content item within an interface displayed by a device. An edit to data within the selected portion of the spreadsheet in the collaborative content item is received 850 by the collaborative content management system. The collaborative content management system then updates 860 the spreadsheet to reflect the received edit to the portion of the spreadsheet embedded within the collaborative content item.

Spreadsheet Tasks

When working collaboratively on a spreadsheet, the ability to organize tasks within the spreadsheet is limited. For instance, spreadsheet applications are primarily used for data storage and analysis, and thus aren't necessary suitable for organizing tasks in a collaborative project. Providing a platform that allows users to access to more functions such as organizing data, making graphs, and the like while also enabling users to organize a set of tasks in the cells of the spreadsheet can improve efficiency and organization for collaborative work. As noted herein, cells can include descriptions of tasks, have interactive progress trackers that the users can adjust as their tasks gets completed, can allow different users to tag or assign members of the group to particular tasks, and can show an overall progress of the set of tasks (for instance, within a visual element displaying task progress).

Figure 9:
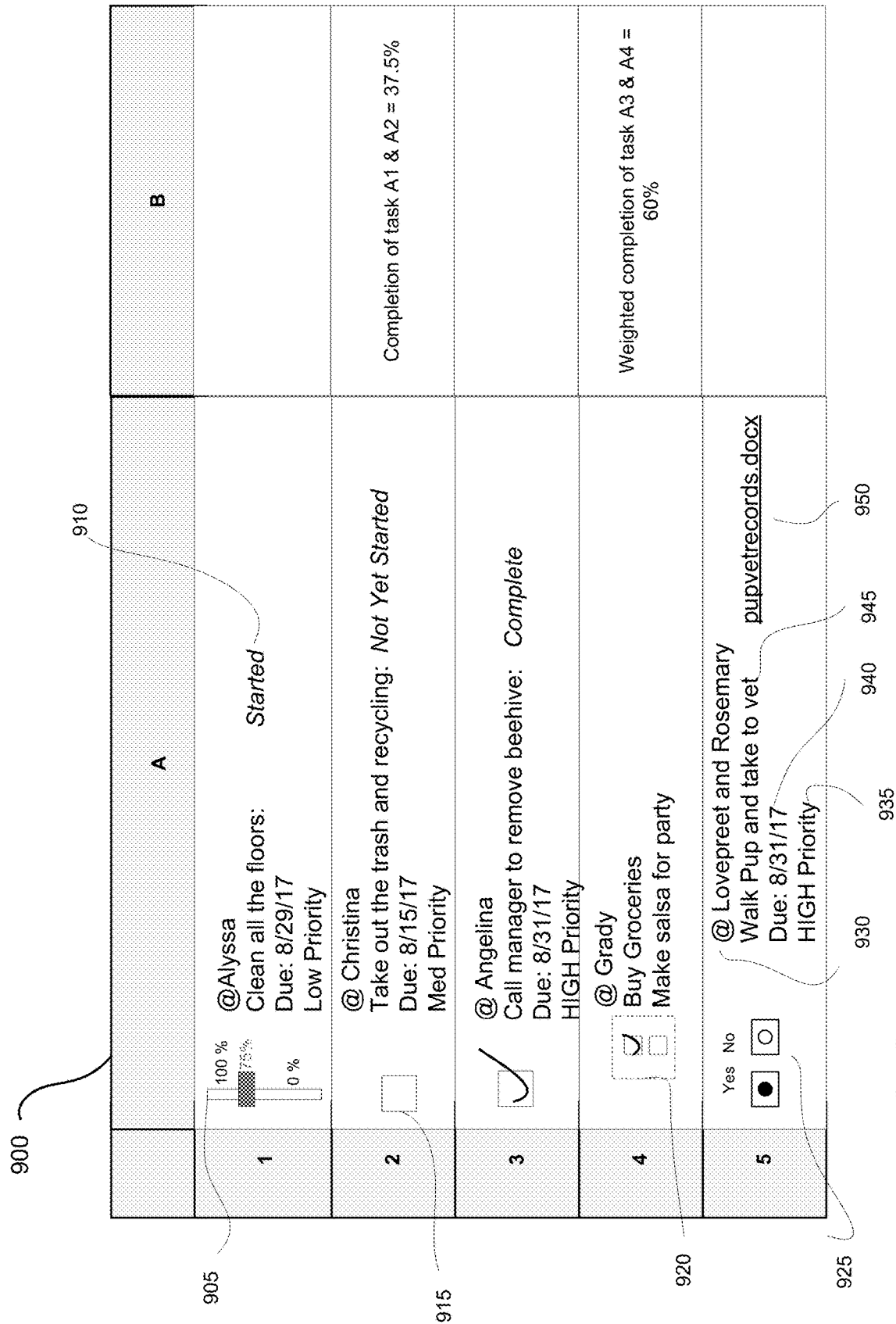
FIG. 9 shows a set of tasks included within the cells of a spreadsheet, according to example embodiments.

FIG. 9 shows a set of tasks included within the cells of a spreadsheet, according to example embodiments. The spreadsheet 900 of FIG. 9 includes a set of cells A1 through A5 that correspond to a set of tasks. Each task of the set of tasks is included within a different cell of the set of cells. Each cell including a task of the set of tasks can display the progress of the task through a status indicator, progress bar, a meter, or the like. The overall progress of the set of tasks can be determined by a formula configured to compute a completion result based on the status indicators of one or more of the cells that include tasks. The completion result can be displayed within a different cell of the spreadsheet, within one of the cells that correspond to the set of tasks, or within an interface element of the spreadsheet or another document. It should be noted that the spreadsheet 900 of FIG. 9 can be a standalone spreadsheet document, can be embedded within a collaborative content item, or can take any other suitable form.

The progress of a task can be set using an interactive element within a cell including the task. Examples of interactive elements include: an adjustable progress bar 905 (or "slider bar"), a checkbox 915, a set of checkboxes 920, a set of yes/no buttons 925, a turnable knob, a field in which data can be included, and the like. For example, cell A1 has an adjustable progress bar 905 indicating that 75% of the task has been completed. The status indicator 910 is linked to the adjustable progress bar 905 and can state "Not Yet Started" when the adjustable progress bar 905 is at 0%, "Started" when the adjustable progress bar 905 lies between 0% and 100%, and "Completed" when the adjustable progress bar 905 is at 100%. In some example embodiments, anyone can use an interactive element to adjust the progress of a task, while in other example embodiments, the only users that can adjust the progress of a task include one or more of: task managers, users with editing permissions, users tagged in or assigned the task, and users involved in a project associated with the set of tasks.

The overall progress of a set of tasks can be calculated by using a formula associated with one or more of the set of cells that sums a completion percentage for each task in the set of tasks to get a completion result corresponding to the overall progress. In some example embodiments, adding together a completion percentage for each task can include weighting individual tasks within a set of tasks (for instance, based on a complexity or importance of each task), and applying the weights to the completion percentage of the tasks to compute the overall completion of the set of tasks. The weight for a task can be defined by a user, can be set by default, can be based on a complexity or importance of the task relative to other tasks in the set of tasks, can be based on a number of sub-tasks associated with the task, or can be computed based on any other suitable metric. In some example embodiments, the sum of the weights applied to a set of tasks is 1.

The overall progress of a set of tasks may be visually displayed, for instance as a percentage, a pie chart, or a progress bar. For instance, to determine the overall progress of tasks A1 and A2 (each equally weighted), the progress of task A1 (75%) and the progress of task A2 (0%) averages out to 37.5%. Likewise, to determine the overall progress of tasks A3 and A4, where task A3 is weighted with a weight of 0.2, and task A4 is weighted with a weight of 0.8, the completion result is (100%)(0.2)+(50%)(0.8)=60%. The computed result for tasks A1 and A2 is displayed within cell B2, and the computed result for tasks A3 and A4 is displayed within cell B4.

A cell including a task can include a task description (for instance, a title of the task, a narrative summary of what the task entails, etc.), a due date corresponding to the task, a person assigned to the task (for instance, someone tagged within the task), a status of the task, a priority indicator, and any related information or documents. In the example shown in FIG. 9, the task included in cell A5 includes the title 945 ("walk Pup and take to vet"), the assignees 930 of the task ("Lovepreet and Rosemary"), the due date 940 ("8/31/17"), and the priority 935 ("HIGH Priority"). In addition, a document 950 titled "pupvetrecords.docx" is embedded in cell A5. In example embodiments, document 950 is linked within the cell A5. The document link can identify a document stored as a collaborative content item in a content management system. In some example embodiments, anyone with access to the spreadsheet 900 can see the set of tasks. In other example embodiments, one or more tasks are associated with an access permission, and only users associated with the access permission can see the one or more tasks. In yet other example embodiments, only managers can see all tasks, while only users assigned to or tagged in a task can see the task but not other tasks to which they are not assigned or tagged.

A task of a set of tasks can be assigned to a user by tagging the user within the task. A first user of the collaborative content item (e.g., spreadsheet) of a collaborative content management system can be tagged by a second user within the task. The first user can receive a notification that the first user was tagged within or assigned a task, where the notification can be received through email, via text message, through the collaborative content management system, and the like. An indication (such as an identity, user name, user primitive, image, or the like) of a user tagged within a task is displayed in the cell of the spreadsheet that includes the task. In some example embodiments, reminders can be sent to the tagged user as the deadline for a task approaches. For instance, the reminder can be sent periodically until the task is completed, or at set intervals before the deadline for the task (e.g., a month before, a week before, and a day before the deadline). The reminder can include information such as information displayed within a cell that includes the task (such as task title, due date, etc.), a location associated with the task, a start time associated with the task, attachments associated with the task, and the like.

In some example embodiments, a first user opens the spreadsheet 900 stored in a collaborative content management system 130 from a first device and selects cells A1 through A5 in the spreadsheet 900 to include a set of tasks. The first user makes a request to edit cells A1 through A5 such that each cell corresponds to a task and includes information associated with the task (i.e., task description, person assigned to the task, etc.) The collaborative content management system 130 updates the spreadsheet 900 to include the information. A second user opens the spreadsheet 900 from a second device and makes a request to change the adjustable progress bar 905 to reflect the progress of the task included within cell A1. The collaborative content management system 130 receives information from the second device describing the change in the adjustable progress bar 905 and updates cell A1 in spreadsheet 900 based on the information. The first device and second device are synced to the collaborative content management system 130 and the spreadsheet 900 displayed within the interface displayed by the first device and second device is updated to reflect the change to the adjustable progress bar in cell A1.

Figure 10:
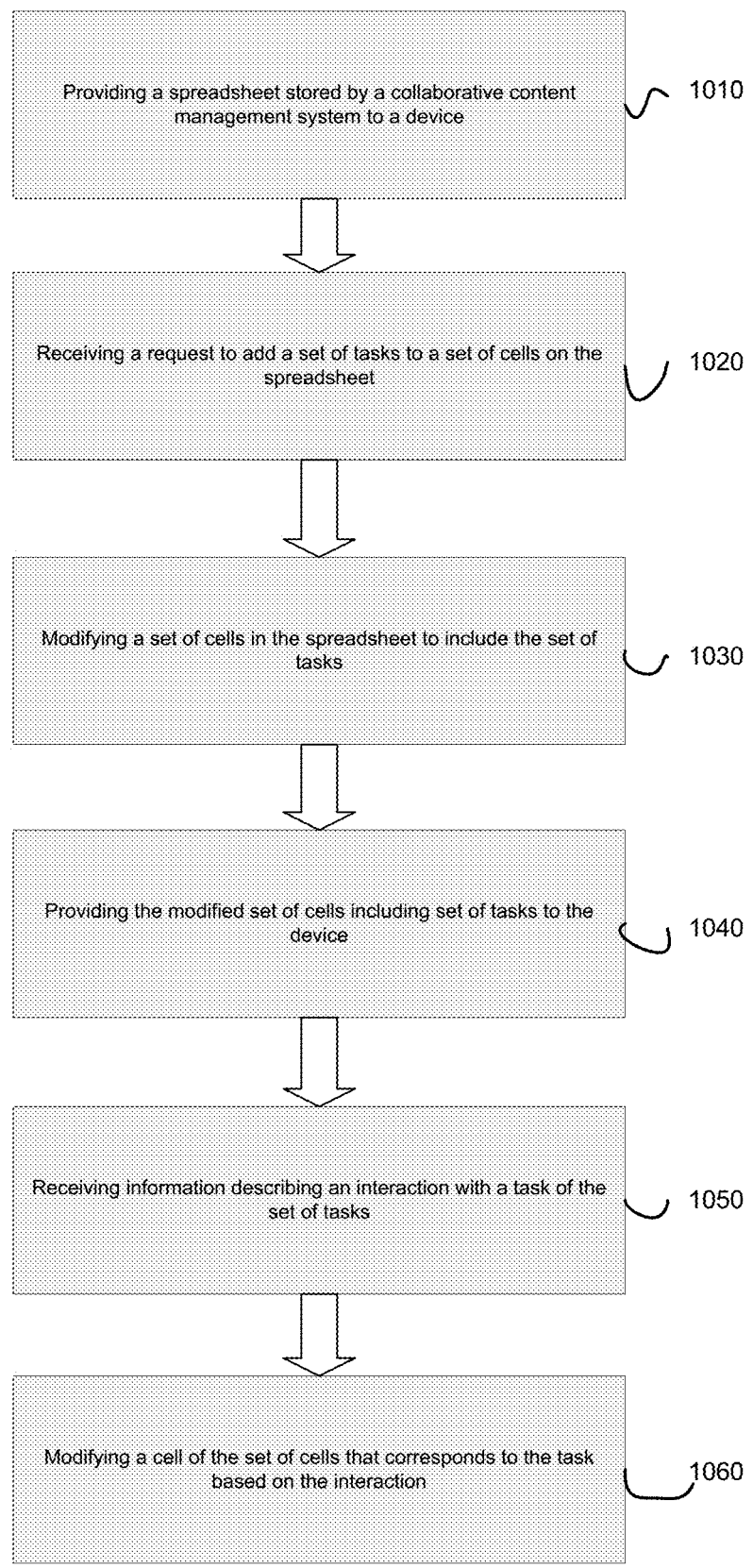
FIG. 10 shows a flow chart that illustrates a process of managing tasks in a spreadsheet, according to example embodiments.

FIG. 10 is a flow chart that illustrates a process of managing tasks in a spreadsheet. In the embodiment of FIG. 10, a collaborative content management system provides 1010 a spreadsheet to a device configured to display the spreadsheet. The collaborative content management system receives 1020 a request to add a set of tasks to a set of cells on the spreadsheet. The collaborative content management system modifies 1030 the set of cells to include the set of tasks. The modified set of cells including the set of tasks is provided 1040 to the device. The collaborative content management system receives 1050 information from the device describing an interaction with a task of the set of tasks (for instance, as described above), and modifies 1060 a cell of the set of cells that correspond to the task based on the interaction.

Embedding Data from Spreadsheet Field into Content Items

In some contexts, a user may want to incorporate a value included within a cell of a spreadsheet within a collaborative content item (e.g., by calculating a formula on a spreadsheet and incorporating the result in a report written in a paper document without necessarily including the set of cells on which the formula acts). When a value of a first cell is incorporated into a document, and the values of one or more cells corresponding to the value of the first cell are edited such that the value of the first cell changes to a new value, the value within the document may not be automatically updated to the new value. This can create outdated data within documents, and can require the manual updating of such values, resulting in a troublesome and error-prone process to ensure the data within the document is up-to-date. By automatically updating such values within documents (for instance, in real-time), data management in documents is simplified, resulting in a better user experience, and decreasing the chances of data errors within documents.

Figure 11:
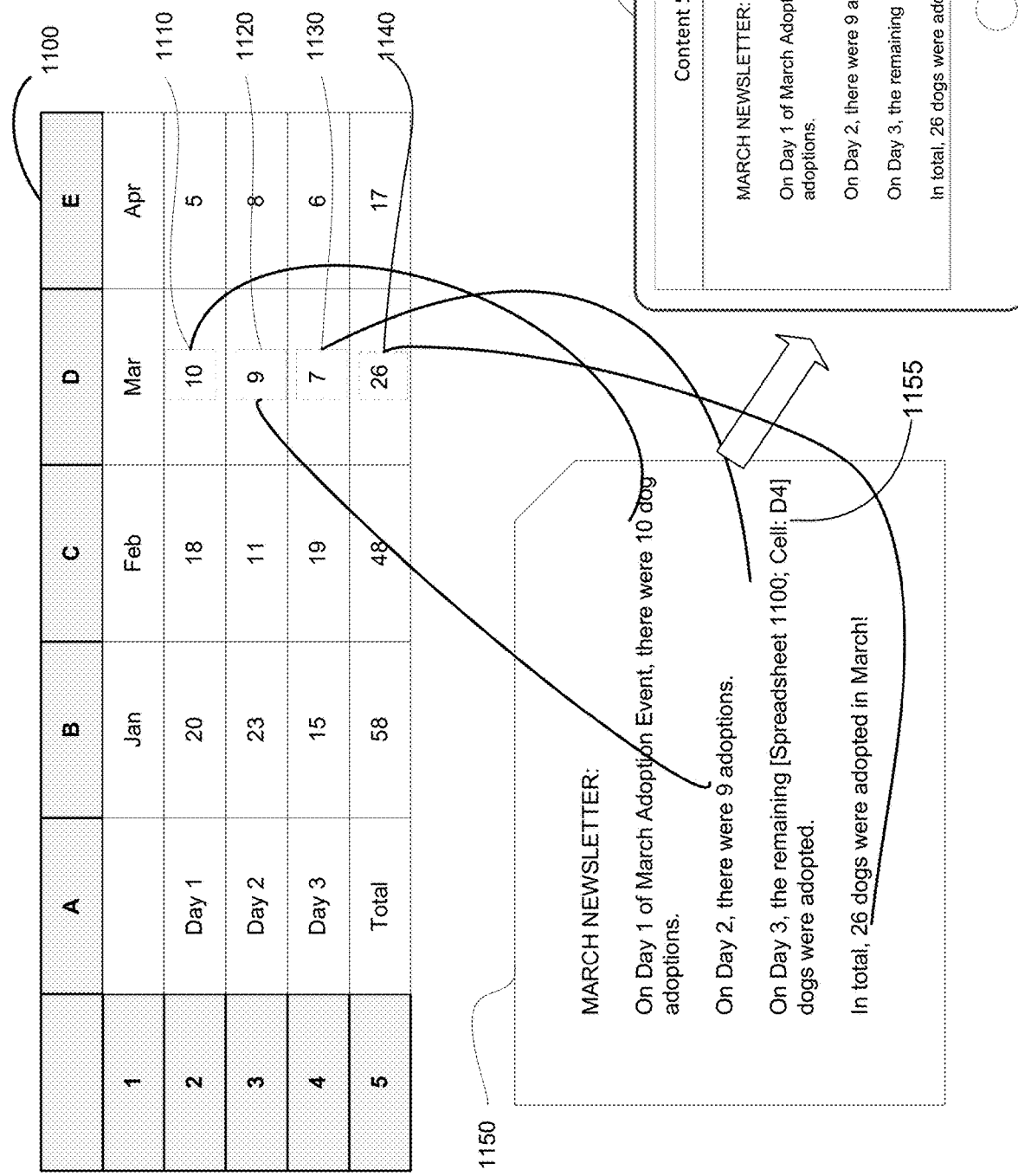
FIG. 11 shows data from a spreadsheet cell embedded in a document within a collaborative content management system, according to example embodiments.

FIG. 11 shows data from a spreadsheet cell embedded in a document within a collaborative content management system. The data value in cells B2 through B4, C2 through C4, D2 through D4, and E2 through E4 of spreadsheet 1100 each correspond to two categories (a "month" category associated with the spreadsheet columns, and a "day" category associated with the spreadsheet rows). Months "Jan", "Feb", "Mar", and "Apr" are displayed in cells B1 through E1, respectively, and days "Day 1", "Day 2", and "Day 3" are displayed in cells A2 through A4, respectively. For example, cell D2 includes a data value of 10 and corresponds to Day 1 in March. A data value included within a cell of the spreadsheet 1100 can be embedded within a document other than a spreadsheet (e.g., a word processing document, a presentation document, etc.) The document can be accessed by a user device 1160 and displayed within an interface of the user device.

In the example embodiment of FIG. 11, a data value 1110 of cell D2 is embedded at a first location in a collaborative content item 1150. The collaborative content item 1150 is stored in a collaborative content management system and is a word processing document that enables different types of data to be inserted within the document. The data value 1110 of cell D2 is embedded as text within a block of text within the collaborative content item 1150. As illustrated in FIG. 11, the data value 1110 is embedded within the collaborative content item 1150 without any corresponding cell structure (e.g., cell boundaries, formatting, etc.). In a first example embodiment, a user can edit the data value 1110 of cell D2 from the spreadsheet 1100 stored in the collaborative content management system. For instance, the user can change a first data value "10" to a second data value "9" in the spreadsheet. In response to the edit made in the spreadsheet 1100, the collaborative content management system updates the text in the collaborative content item 1150 from "10" to "9" in substantially real-time.

The data value 1140 of cell D5 is the result of a formula comprising the summation of the data value 1110 of cell D2, the data value 1120 of cell D3, and the data value 1130 of cell D4. In other words, the data value 1140 depends on the values within the three cells D2 through D4. In a first example embodiment, a user can edit the data value 1120 of cell D3 from the spreadsheet 1100 stored in the collaborative content management system from a first data value "9" to a second data value "10". The collaborative content management system then updates the text of the collaborative content item 1150 from "On Day 2, there were 9 adoptions" to "On Day 2, there were 10 adoptions." Since the data value 1140 is dependent on the data value 1120, the collaborative content management system updates the data value within the cell D5 such that the data value of cell D5 is updated from "26" to "27" to reflect the change to the value of cell D3. Likewise, the collaborative content management system updates the text in collaborative content item 1150 from "In total, 26 dogs were adopted in March!" to "In total, 27 dogs were adopted in March!" In other example embodiments, the data value 1140 of cell D5 is the result of an extrapolation formula, a count formula (e.g., a count of Boolean values associated with other cells), or any other suitable formula.

In some example embodiments, the collaborative content management system receives a request to embed a data value into a document with a selection of a location within the document for the data value to be displayed. The document is modified to include a pointer within the document to the target location of the data value, identifying the spreadsheet and the cell that the data value is from. In the embodiment of FIG. 11, the collaborative content management system receives a request to embed the data value "7" as text in the collaborative content item 1150 in a location between the text "On Day 3, the remaining" and "dogs were adopted." At the location, a pointer 1155 identifies the spreadsheet and the cell that the data value "7" is from.

Figure 12:
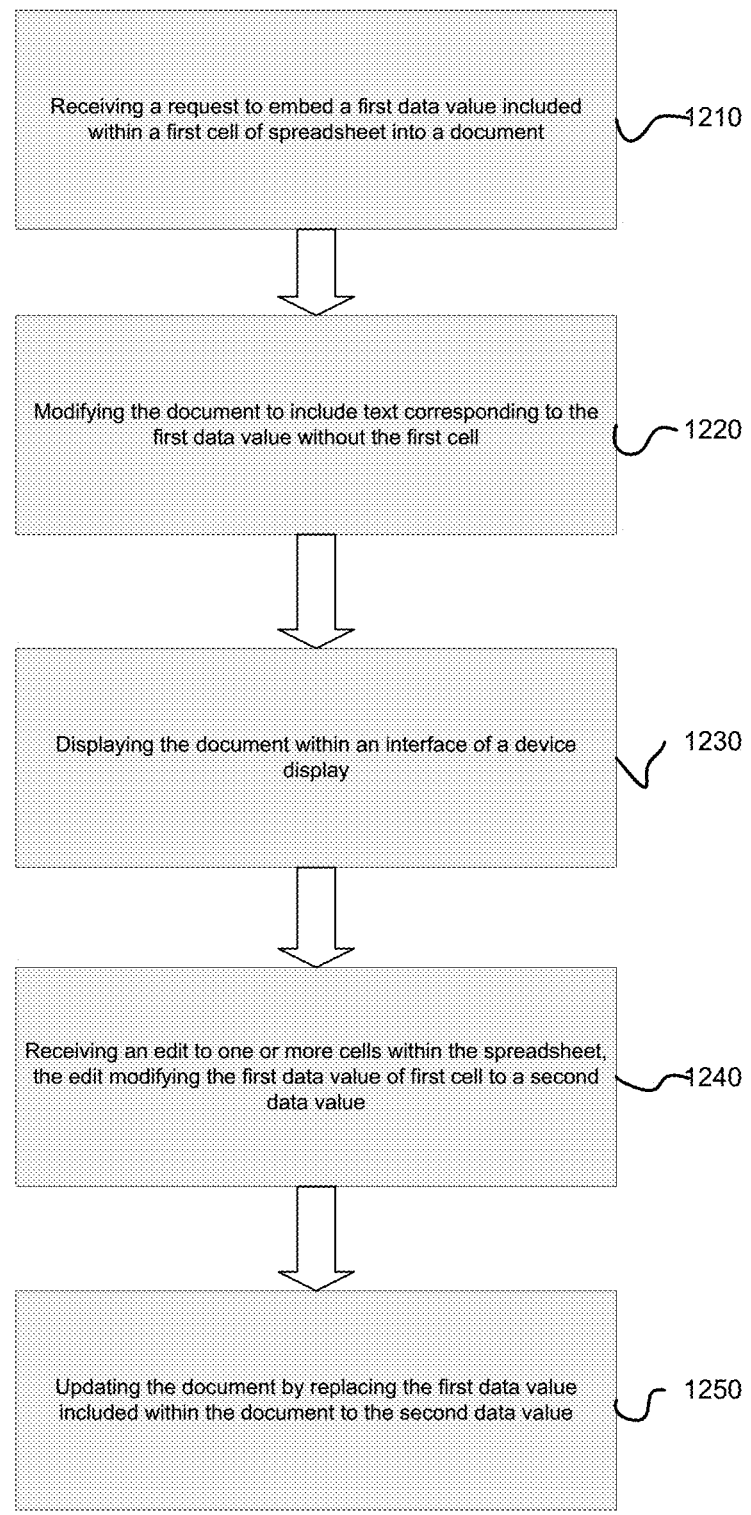
FIG. 12 shows a flow chart that illustrates a process of embedding data from a spreadsheet into a document, according to example embodiments.

FIG. 12 is a flow chart that illustrates a process of embedding data from a spreadsheet into a document. In the embodiment of FIG. 12, a collaborative content management system receives 1210 a request to embed a first data value included within a first cell of a spreadsheet into a document. The collaborative content management system modifies 1220 the document to include text corresponding to the first data value without the structure of the first cell. The document is displayed 1230 within an interface of a device display such that the first data value is displayed within the document. The spreadsheet receives 1240 an edit to one or more cells within the spreadsheet, which causes a modification of the first data value of the first cell from the first data value to a second data value. In response to the edit, the document is automatically updated 1250 by replacing the first data value included within the document with the second data value.

Navigation of Comments within a Spreadsheet

When collaboratively working on a spreadsheet (for instance, within a spreadsheet document, or a portion of spreadsheet embedded within another document), a user may want to make a comment about a subset of cells and direct the attention of other users to the subset of cells. When multiple users are making comments and the comments are scattered throughout different subsets of cells within the spreadsheet, having a transitory interface element (e.g., an interface element that can move to accommodate a comment location within the spreadsheet, and that isn't fixed to a particular interface location) display the comment with other details such as user ID, profile picture, and user primitive near the subset of cells associated with the comment can improve a user's ability to navigate between comments.

FIGS. 13a through 13c illustrate the navigation of comments within a spreadsheet, according to some example embodiments. In a spreadsheet, a user can make a comment associated with a set of cells (e.g., one cell, multiple cells in a row or a column, or multiple cells in multiple rows and/or columns). Comments can be made by users, or can be included by the collaborative content management system 130. Each comment is associated with an index, and an indication of the index can be displayed within one or more of the cells of the set of cells corresponding to the comment. The comments may be assigned an index number based on one or more of: a location of a representative cell within the spreadsheet associated with a comment, a row or column corresponding to the comment, a most recent edit to the spreadsheet, a most recent comment on the spreadsheet, an order in which the comment was received (relative to other comments), an author of the comment, a number of comments associated with the set of cells, a task associated with the set of cells, an identity of a user tagged in the set of cells, a number of entries or chat messages within a discussion chain corresponding to the comment, a user selection of an index for the comment, a title of the comment, any attachments within the comment, and the like. A comment can be displayed within an interface element of the spreadsheet displayed at a location within the spreadsheet corresponding to the set of cells associated with the comment.

In the example shown in FIG. 13A, an interface element 1300 is associated with cell B5, which includes the value "1000". The value within cell B5 is the result of a formula which depends on cells B2 through B4. An index indicator 1310 is displayed with the cell B5 (for instance, to the left of the data value "1000"), indicating that the cell B5 is associated with a first comment of a set of comments. The interface element 1300 has a set of navigation buttons 1350 which enables a user to navigate to a next comment within the set of comments or a previous comment of the set of comments. As used herein, a "next comment" can refer to a comment associated with an index value immediately subsequent to an index value associated with a current or displayed comment, a comment immediately subsequent to a current comment within an ordered set of comments, a comment closest to a current comment (for instance, a comment within a same row or column, or a closest row or column), a comment made by a same user as a current comment, a comment made at a subsequent time closest to a current comment, or a comment selected based on any other suitable factors. Likewise, a "previous comment" can refer to a comment associated with an index value immediately preceding an index value associated with a current or displayed comment, a comment immediately preceding a current comment within an ordered set of comments, a comment closest in preceding time or location to a current comment, and the like. The collaborative content management system can receive a request to display a next comment (for instance, in response to receiving a selection of the right arrow of the navigation buttons 1350). In response, the interface element 1300 is moved to a location corresponding to a next comment (included within cell C3) (as shown in FIG. 13B). Likewise, a request to display a next comment can be received, and the interface element 1300 can be moved to a location corresponding a third comment (included within cell E1) (as shown in FIG. 13C).

In the example shown in FIG. 13A, a first user "Sean" makes a first comment about the value in cell B5, directed towards "Geena". The interface element 1300 includes a first user identifier or name 1345, a first profile picture 1315, a first comment 1320 and a user primitive 1340. A user with permission to access the spreadsheet is represented by a second profile picture 1325, and with permission to edit the spreadsheet is presented with the reply box 1330 (to enter a text reply) and attachments element 1335 (to attach files such as images, documents, graphs, emojis, GIFs, and the like to the comment).

In FIG. 13B, the interface element 1300 moves from the first location illustrated in FIG. 13A to a second location corresponding to the index 1312 in representative cell C3. In some example embodiments, the comment associated with the cell C3 can be chosen as the second comment or the next comment because no other comment is associated with a cell closer to the cell B5. The interface element 1300 is overlaid onto the spreadsheet at the second location such that portions of the spreadsheet surround all or part of the interface element 1300. The interface element 1300 includes two comments stacked vertically with the first comment 1360 on top of the second comment 1365.

In FIG. 13C, the interface element 1300 moves from the second location shown in FIG. 13B to a third location associated with cell E1 (which includes a third comment). In the embodiment of FIG. 13C, the interface element 1300 is overlaid onto the spreadsheet such that the values in column E are visible. In the example shown in FIG. 13C, an interactive element 1375 and a graph 1370 associated with a poll are displayed within the interface element 1300. Users with access to the spreadsheet can participate in the poll by choosing a button of the interactive element 1375. The content included within the interface element 1300 can include any type of data, such as text data, audio data, image data, video data, URLs, structured data, unstructured data, and the like.

As noted above, when a request is received to navigate to a next comment within a spreadsheet, the interface window 1300 displaying information associated with the comment is moved to a new location associated with the next comment. In some example embodiments, the new location of the interface window 1300 causes the interface window to overlap or partially overlap with one or more cells associated with the next comment. In other example embodiments, the new location of the interface window 1300 does not overlap with cells associated with the next comment. The new location of the interface window 1300 may also be selected such that while the displayed interface window overlaps in part with one or more cells associated with the comment, the displayed interface window does not overlap with data displayed within the cells. In some example embodiments, the new location of the interface window 1300 is a threshold distance away from the cells associated with the comment. If the next comment in an ordered set of comments is associated with one or more cells not shown within a displayed portion of a spreadsheet, the displayed portion of the spreadsheet can shift or scroll such that one or more cells associated with the next comment are displayed, and the location of the interface window 1300 is selected after the displayed portion of the spreadsheet is shifted.

Figure 14:
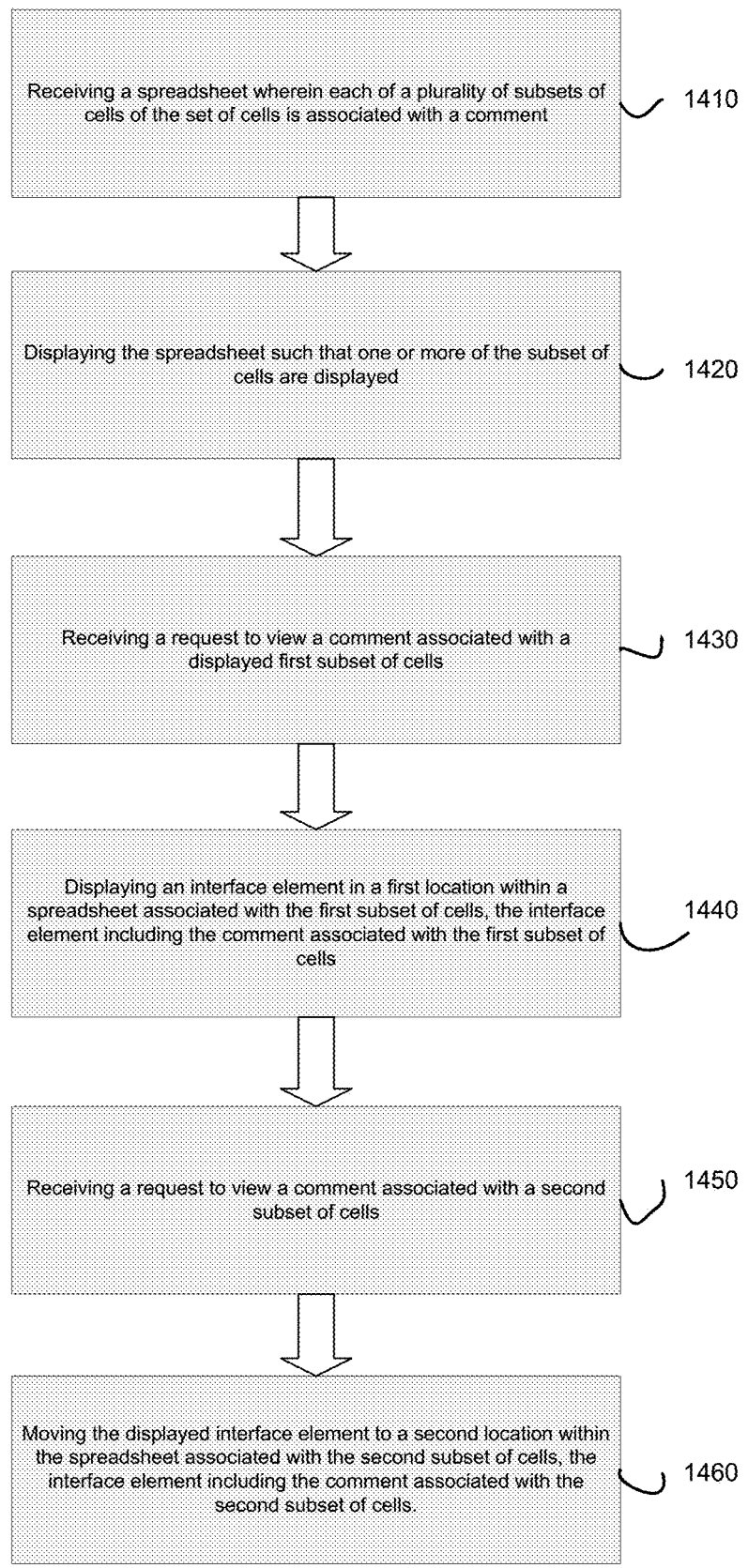
FIG. 14 shows a flow chart that illustrates a process of navigating comments within a spreadsheet, according to example embodiments.

FIG. 14 is a flow chart that illustrates a process of navigating comments within a spreadsheet. A device receives 1410 a spreadsheet including a set of cells organized into one or more columns and one or more rows, wherein each of a plurality of subsets of cells of the set of cells is associated with a comment. The device displays 1420 the spreadsheet such that one or more of the subset of cells are displayed. The device receives 1430 a request to view a first comment associated with a displayed first subset of cells. The device displays 1440 an interface element in a first location associated with the first subset of cells, the interface element including the comment associated with the first subset of cells. The device receives 1450 a request to view a second comment associated with a second subset of cells. The device moves 1460 the displayed interface element to a second location associated with the second subset of cells, the interface element including the second comment associated with the second subset of cells.

Additional Considerations

Reference in the specification to "one embodiment" or to "example embodiments" means that a particular feature, structure, or characteristic described in connection with the example embodiments is included in at least one embodiment. The appearances of the phrase "in one embodiment" in various places in the specification are not necessarily all referring to the same embodiment.

In this description, the term "module" refers to a physical computer structure of computational logic for providing the specified functionality. A module can be implemented in hardware, firmware, and/or software. In regards to software implementation of modules, it is understood by those of skill in the art that a module comprises a block of code that contains the data structure, methods, classes, header and other code objects appropriate to execute the described functionality. Depending on the specific implementation language, a module may be a package, a class, or a component. It will be understood that any computer programming language may support equivalent structures using a different terminology than "module."

It will be understood that the named modules described herein represent one embodiment of such modules, and other example embodiments may include other modules. In addition, other example embodiments may lack modules described herein and/or distribute the described functionality among the modules in a different manner. Additionally, the functionalities attributed to more than one module can be incorporated into a single module. Where the modules described herein are implemented as software, the module can be implemented as a standalone program, but can also be implemented through other means, for example as part of a larger program, as a plurality of separate programs, or as one or more statically or dynamically linked libraries. In any of these software implementations, the modules are stored on the computer readable persistent storage devices of a system, loaded into memory, and executed by the one or more processors of the system's computers.

The operations herein may also be performed by an apparatus. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including optical disks, CD-ROMs, read-only memories (ROMs), random access memories (RAMs), magnetic or optical cards, or any type of media suitable for storing electronic instructions, and each coupled to a computer system bus. Furthermore, the computers referred to in the specification may include a single processor or may be architectures employing multiple processor designs for increased computing capability.

The algorithms presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, the present technology is not described with reference to any particular programming language. It will be appreciated that a variety of programming languages may be used to implement the teachings of the present technology as described herein, and any references above to specific languages are provided for disclosure of enablement and best mode of the present technology.

While the technology has been particularly shown and described with reference to a preferred embodiment and several alternate example embodiments, it will be understood by persons skilled in the relevant art that various changes in form and details can be made therein without departing from the spirit and scope of the technology.

As used herein, the word "or" refers to any possible permutation of a set of items. Moreover, claim language reciting 'at least one of' an element or another element refers to any possible permutation of the set of elements.

Although this description includes a variety of examples and other information to explain aspects within the scope of the appended claims, no limitation of the claims should be implied based on particular features or arrangements these examples. This disclosure includes specific example embodiments and implementations for illustration, but various modifications can be made without deviating from the scope of the example embodiments and implementations. For example, functionality can be distributed differently or performed in components other than those identified herein. This disclosure includes the described features as non-exclusive examples of systems components, physical and logical structures, and methods within its scope.

Finally, it should be noted that the language used in the specification has been principally selected for readability and instructional purposes, and may not have been selected to delineate or circumscribe the inventive subject matter. Accordingly, the disclosure of the present technology is intended to be illustrative, but not limiting, of the scope of the technology, which is set forth in the following claims.

What is claimed is:

1. A method comprising:
    receiving, by a collaborative content management system from a first device, a request to embed a first data value included within a first cell of a spreadsheet in a first file at a position within a second file different from the first file, wherein the first file and the second file are collaborative content items accessible by the first device and a second device and stored by the collaborative content management system at respective storage locations of a remote storage system, the respective storage locations identified by respective content paths within a content directory;

responsive to receiving the request, embedding, by the collaborative content management system, a pointer to the first data value without including a structure of the first cell in the second file, the pointer embedded at the position within the second file identifying the spreadsheet and the first cell, the pointer instructing that when an edit is made in the first file that modifies the first data value, the second file be updated to incorporate the first data value;

causing display, by the collaborative content management system, of the second file within an interface of a device display of the first device such that the first data value is displayed at the position within the second file;

receiving, at a given time, by the collaborative content management system via the first file, an edit by the second device to one or more cells included within the first file, the edit to the one or more cells modifying the first data value of the first cell to a second data value; and responsive to receiving the edit, dynamically updating, by the collaborative content management system and based on the pointer, the second file by replacing the first data value included within the second file with the second data value, the update to the second file occurring regardless of whether the second file is displayed at the given time.

2. The method of claim 1, wherein a formula is associated with the first cell and the one or more cells such that the second data value is based on data values within the one or more cells and the formula.

3. The method of claim 2, wherein the formula comprises a summation of the data values within the one or more cells, and wherein the second data value comprises a result of the summation of the data values.

4. The method of claim 2, wherein the formula comprises an extrapolation formula, and wherein the second data value is an extrapolation based on the data values within the one or more cells.

5. The method of claim 2, wherein the formula comprises a count formula, wherein the data values within the one or more cells comprise Boolean values, and wherein the second data value comprises one or more of a count of "0" values within the data values or a count of "1" values within the data values.

6. The method of claim 1, wherein the one or more cells include the first cell, and wherein the edit to the one or more cells includes an edit changing the first data value within the first cell to the second data value.

7. The method of claim 1, wherein the received request to embed the first data value at the position within the second file includes a selection of the location within the second file for the first data value to be displayed.

8. The method of claim 1, wherein the second file is updated in substantially real-time in response to receiving the edit to the one or more cells included within the spreadsheet in the first file.

9. The method of claim 1, wherein the first data value is displayed within the second file in response to an owner of the device display having permission to view the spreadsheet in the first file, and wherein the first data value is hidden in response to the owner of the device display not having permission to view the spreadsheet in the first file.

10. A system comprising:
one or more processors; and
a non-transitory computer-readable storage medium storing executable computer instructions that, when executed by the one or more processors, cause the one or more processors to perform steps comprising:
receiving, from a first device, a request to embed a first data value included within a first cell of a spreadsheet in a first file at a position within a second file different from the first file, wherein the first file and the second file are collaborative content items accessible by the first device and a second device and stored by a collaborative content management system at respective storage locations of a remote storage system, the respective storage locations identified by respective content paths within a content directory;

responsive to receiving the request, embedding a pointer to the first data value without including a structure of the first cell in the second file, the pointer embedded at the position within the second file identifying the spreadsheet and the first cell, the pointer instructing that when an edit is made in the first file that modifies the first data value, the second file be updated to incorporate the first data value;

causing display of the second file within an interface of a device display of the first device such that the first data value is displayed at the position within the second file;

receiving, at a given time via the first file, an edit by the second device to one or more cells included within the first file, the edit to the one or more cells modifying the first data value of the first cell to a second data value; and responsive to receiving the edit, dynamically updating, based on the pointer, the second file by replacing the first data value included within the second file with the second data value, the update to the second file occurring regardless of whether the second file is displayed at the given time.

11. The system of claim 10, wherein a formula is associated with the first cell and the one or more cells such that the second data value is based on data values within the one or more cells and the formula.

12. A non-transitory computer-readable storage medium storing executable computer instructions that, when executed by one or more processors, cause the one or more processors to perform steps comprising:
receiving, from a first device, a request to embed a first data value included within a first cell of a spreadsheet in a first file at a position within a second file different from the first file, wherein the first file and the second file are collaborative content items accessible by the first device and a second device and stored by a collaborative content management system at respective storage locations of a remote storage system, the respective storage locations identified by respective content paths within a content directory;

responsive to receiving the request, embedding to a pointer the first data value without including a structure of the first cell in the second file, the pointer embedded at the position within the second file identifying the spreadsheet and the first cell, the pointer instructing that when an edit is made in the first file that modifies the first data value, the second file be updated to incorporate the first data value;

causing display of the second file within an interface of a device display of the first device such that the first data value is displayed at the position within the second file;

receiving, at a given time via the first file, an edit by the second device to one or more cells included within the first file, the edit to the one or more cells modifying the first data value of the first cell to a second data value; and responsive to receiving the edit, dynamically updating, based on the pointer, the second file by replacing the first data value included within the second file with the second data value, the update to the second file occurring regardless of whether the second file is displayed at the given time.

13. The computer-readable storage medium of claim 12, wherein a formula is associated with the first cell and the one or more cells such that the second data value is based on data values within the one or more cells and the formula.

14. The computer-readable storage medium of claim 12, wherein the second file comprises a word processing document.

15. The computer-readable storage medium of claim 14, wherein the word processing document includes a block of text, and wherein the first data value corresponds to text included within the block of text.

16. The computer-readable storage medium of claim 15, wherein the block of text describes the first data value.

17. The computer-readable storage medium of claim 12, wherein the received request to embed the first data value at the position within the second file includes a selection of the location within the second file for the first data value to be displayed.

18. The method of claim 1, wherein the collaborative content items are accessible by the first device and the second device via respective content pointers provided by the collaborative content management system.

19. The method of claim 1, wherein the collaborative content management system manages the collaborative content items using the content directory, each entry of the content directory comprising a content path and a content pointer identifying a collaborative content item.

20. The method of claim 1, wherein the structure of the first cell includes one or more of cell boundaries or cell formatting.

* * * * *